United States Patent
Hannuksela et al.

(10) Patent No.: US 11,671,588 B2
(45) Date of Patent: Jun. 6, 2023

(54) APPARATUS, A METHOD AND A COMPUTER PROGRAM FOR VIDEO CODING AND DECODING

(71) Applicant: Nokia Technologies Oy, Espoo (FI)

(72) Inventors: Miska Hannuksela, Tampere (FI); Alireza Aminlou, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/483,243

(22) Filed: Sep. 23, 2021

(65) Prior Publication Data

US 2022/0014733 A1     Jan. 13, 2022

Related U.S. Application Data

(62) Division of application No. 16/753,511, filed as application No. PCT/FI2018/050709 on Oct. 3, 2018, now Pat. No. 11,166,013.

(30) Foreign Application Priority Data

Oct. 9, 2017    (FI) ...................................... 20175881

(51) Int. Cl.
    *H04N 19/105*      (2014.01)
    *H04N 19/174*      (2014.01)
                 (Continued)

(52) U.S. Cl.
    CPC ......... *H04N 19/105* (2014.11); *H04N 13/161* (2018.05); *H04N 19/174* (2014.11);
                 (Continued)

(58) Field of Classification Search
None
See application file for complete search history.

(56) References Cited

U.S. PATENT DOCUMENTS

| | | | |
|---|---|---|---|
| 6,400,763 B1 | 6/2002 | Wee | |
| 9,497,481 B2 | 11/2016 | Kitahara et al. | |

(Continued)

FOREIGN PATENT DOCUMENTS

| | | |
|---|---|---|
| CN | 105027567 A | 11/2015 |
| EP | 3346709 A1 | 7/2018 |

(Continued)

OTHER PUBLICATIONS

Notice of Preliminary Rejection received for corresponding Korean Patent Application No. 2022-7020231, dated Jul. 25, 2022, 4 pages of Notice of Preliminary Rejection and 3 pages of translation available.

(Continued)

*Primary Examiner* — James M Anderson, II
(74) *Attorney, Agent, or Firm* — Harrington & Smith

(57) ABSTRACT

A method comprising: encoding an input picture into a coded constituent picture; reconstructing, as a part of said encoding, a decoded constituent picture corresponding to the coded constituent picture; encoding a spatial region into a coded tile, the encoding comprising: determining a horizontal offset and a vertical offset indicative of a region-wise anchor position of the spatial region within the decoded constituent picture; encoding the horizontal offset and the vertical offset; determining that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region; indicating that the prediction unit is predicted relative to a prediction-unit anchor position that is relative to the horizontal and vertical offset; deriving a prediction-unit anchor position equal to sum of (Continued)

the first horizontal coordinate and the horizontal offset, and the first vertical coordinate and the vertical offset, respectively; and determining a motion vector for the prediction unit; and applying the motion vector relative to the prediction-unit anchor position to obtain a prediction block.

20 Claims, 15 Drawing Sheets

(51) Int. Cl.
  H04N 19/33    (2014.01)
  H04N 19/39    (2014.01)
  H04N 19/55    (2014.01)
  H04N 19/597   (2014.01)
  H04N 13/161   (2018.01)
(52) U.S. Cl.
  CPC ............. *H04N 19/33* (2014.11); *H04N 19/39* (2014.11); *H04N 19/55* (2014.11); *H04N 19/597* (2014.11)

(56) References Cited

U.S. PATENT DOCUMENTS

| | | | |
|---|---|---|---|
| 2013/0287093 | A1 | 10/2013 | Hannuksela et al. |
| 2014/0286409 | A1 | 9/2014 | Zhang et al. |
| 2014/0301463 | A1* | 10/2014 | Rusanovskyy ........ H04N 19/52 375/240.16 |
| 2015/0023423 | A1 | 1/2015 | Zhang et al. |
| 2015/0326875 | A1 | 11/2015 | Chen et al. |
| 2015/0381999 | A1 | 12/2015 | Chuang et al. |
| 2016/0029041 | A1 | 1/2016 | Maeda et al. |
| 2017/0026659 | A1 | 1/2017 | Lin et al. |
| 2017/0118540 | A1* | 4/2017 | Thomas ......... H04N 21/440263 |
| 2017/0289556 | A1* | 10/2017 | Hendry ................. H04N 19/30 |

FOREIGN PATENT DOCUMENTS

| | | |
|---|---|---|
| EP | 3349467 A1 | 7/2018 |
| EP | 3422724 A1 | 1/2019 |
| KR | 10-1630564 B1 | 6/2016 |
| KR | 2017-0018352 A | 2/2017 |
| KR | 2017-0021302 A | 2/2017 |
| RU | 2537803 C2 | 1/2015 |
| RU | 2603548 C2 | 11/2016 |
| WO | 2015/192353 A1 | 12/2015 |
| WO | 2015/197815 A1 | 12/2015 |
| WO | 2017/140945 A1 | 8/2017 |
| WO | 2017/162911 A1 | 9/2017 |
| WO | 2018/178507 A1 | 10/2018 |
| WO | 2019/002662 A1 | 1/2019 |
| WO | 2019/073113 A1 | 4/2019 |

OTHER PUBLICATIONS

"Information technology—Coding of audio-visual objects—Part 15: Carriage of network abstraction layer (NAL) unit structured video in the ISO base media file format", ISO/IEC 14496-15, Fourth edition, Feb. 2017, 19 pages.

Li et al., "A Fast Inter Frame Prediction Algorithm for Multi-View Video Coding", IEEE International Conference on Image Processing, Sep. 16-Oct. 19, 2007, pp. III-417-III-420.

Information technology—Generic coding of moving pictures and associated audio information: Systems, Series H: Audiovisual And Multimedia Systems, Infrastructure of audiovisual services—Transmission multiplexing and synchronization, Recommendation ITU-T H.222.0, Mar. 2017, 291 pages.

"Information technology—Coding of audiovisual objects—Part 12: ISO base media file format", ISO/IEC 14496-12, Fifth Edition, Dec. 15, 2015, 248 pages.

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Dec. 2016, 664 pages.

Parameter Values For Ultra-High Definition Television Systems For Production And International Programme Exchange, Recommendation ITU-R BT.2020, Aug. 2012, 7 pages.

"Parameter Values for the HDTV Standards for Production and International Programme Exchange", Recommendation ITU-R BT.709-6, Jun. 2015, 19 pages.

"3rd Generation Partnership Project; Technical Specification Group Services and System Aspects; Transparent end-to-end Packet-switched Streaming Service (PSS); Protocols and codecs (Release 9)", 3GPP TS 26.234, V9.10.0, Jun. 2013, pp. 1-189.

"Information technology—Dynamic adaptive streaming over HTTP (DASH)—Part 1: Media presentation description and segment formats", ISO/IEC 23009-1, May 15, 2014, 152 pages.

"3rd Generation Partnership Project; Technical Specification Group Services and System Aspects; Transparent end-to-end Packet-switched Streaming Service (PSS); Progressive Download and Dynamic Adaptive Streaming over HTTP (3GP DASH) (Release 15)", 3GPP TS 26.247, V15.0.0, Sep. 2017, pp. 1-128.

Pantos et al., "HTTP Live Streaming", RFC 8216, Aug. 2017, pp. 1-60.

Office action received for corresponding Finnish Patent Application No. 20175881, dated May 17, 2018, 9 pages.

Youvalari et al., "Viewport-Dependent Delivery Schemes for Stereoscopic Panoramic Video", 3DTV Conference: The True Vision—Capture, Transmission and Display of 3D Video (3DTV-CON), Jun. 7-9, 2017, 4 pages.

Fuente et al., "Video Processing for Panoramic Streaming using HEVC and Its Scalable Extensions", Multimedia Tools and Applications, vol. 76, Feb. 2017, pp. 5631-5659.

International Search Report and Written Opinion received for corresponding Patent Cooperation Treaty Application No. PCT/FI2018/050709, dated Jan. 22, 2019, 19 pages.

Office action received for corresponding Russian Patent Application No. 2020114245, dated Jul. 29, 2020, 5 pages of office action and 5 pages of translation available.

Notice of Allowance received for corresponding U.S. Appl. No. 16/753,511, dated Jun. 30, 2021, 9 pages.

Extended European Search Report received for corresponding European Patent Application No. 18865590.6, dated Jul. 1, 2021, 12 pages.

Office action received for corresponding Korean Patent Application No. 2020-7013043, dated Aug. 20, 2021, 6 pages of office action and 3 pages of translation available.

Office action received for corresponding Indian Patent Application No. 202047019138, dated Nov. 5, 2021, 6 pages.

\* cited by examiner

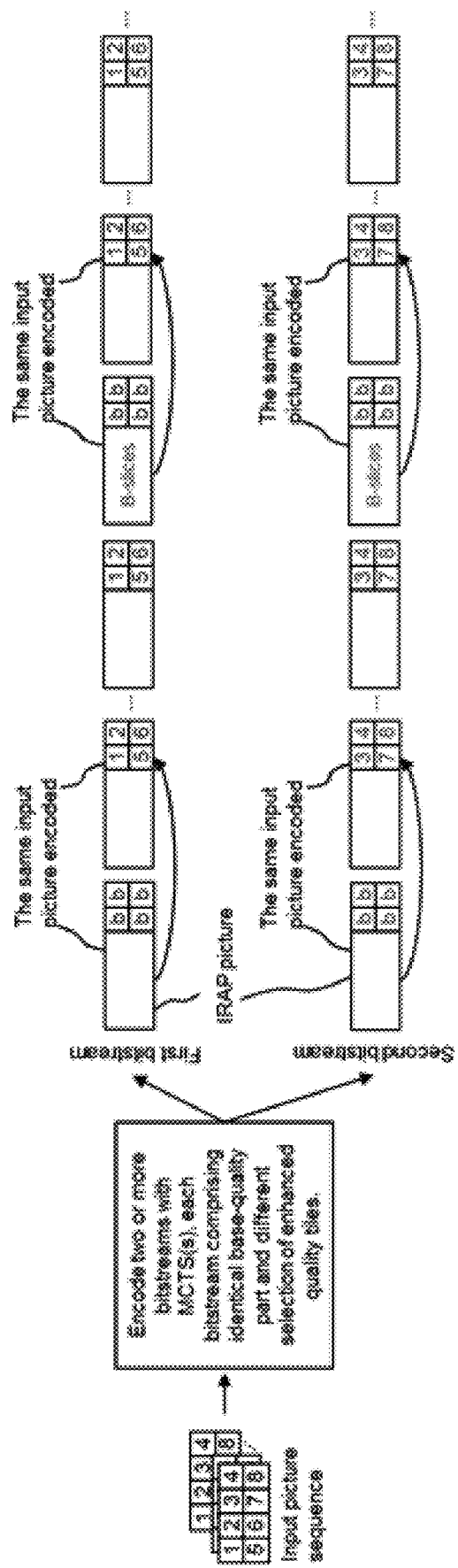
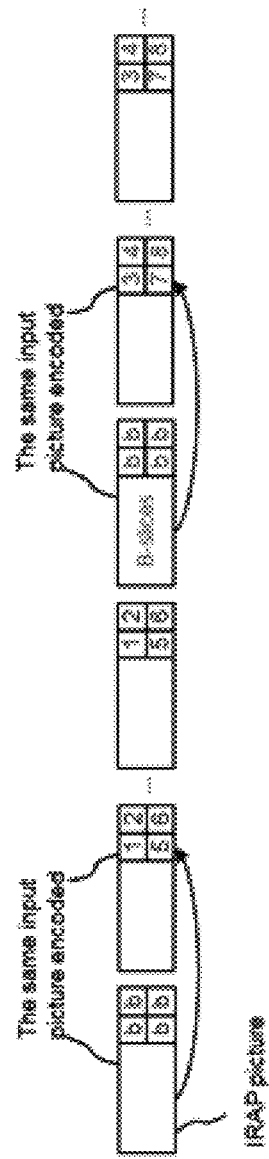
Fig. 11a
Fig. 11b

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

Recently, the development of various multimedia streaming applications, especially 360-degree video or virtual reality (VR) applications, has advanced with big steps. In viewport-adaptive streaming, the bitrate is aimed to be reduced e.g. such that the primary viewport (i.e., the current viewing orientation) is transmitted at the best quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation.

There are several alternatives to deliver the viewport-dependent omnidirectional video. It can be delivered, for example, as equal-resolution High Efficiency Video Coding (HEVC) bitstreams with motion-constrained tile sets (MCTSs). Thus, several HEVC bitstreams of the same omnidirectional source content are encoded at the same resolution but different qualities and bitrates using motion-constrained tile sets. Another option to deliver the viewport-dependent omnidirectional video is to carry out HEVC Scalable Extension (SHVC) region-of interest scalability encoding. Therein, the base layer is coded conventionally and region-of-interest (ROI) enhancement layers are encoded with SHVC Scalable Main profile. However, limited support of the available decoding hardware for inter-layer prediction, such as the SHVC extension of HEVC, restricts the usability of the SHVC ROI encoding.

A further method is called constrained inter-layer prediction (CILP). In CILP, certain input pictures are chosen to be encoded into two coded pictures in the same bitstream, the first referred to as a shared coded picture. A shared coded picture in a first bitstream is identical to the respective shared coded picture in a second bitstream. The encoding method facilitates decoding a first bitstream up to a selected shared coded picture, exclusive, and decoding a second bitstream starting from the respective shared coded picture. No intra-coded picture is required to start the decoding of the second bitstream, and consequently compression efficiency is improved compared to a conventional approach.

CILP enables the use of HEVC Main profile encoder and decoder, and hence has better compatibility with implementations than the SHVC ROI approach. Moreover, CILP takes advantage of relatively low intra picture frequency (similarly to the SHVC ROI approach). However, when compared to the SHVC ROI approach, CILP suffers from the use of MCTSs for the base-quality tiles and CILP has inferior streaming rate-distortion performance compared to SHVC-ROI when finer tile grids are used. Accordingly, the SHVC ROI and the CILP approaches have advantages over each other in different situations, but neither of them outperforms the other in all situations.

SUMMARY

Now in order to at least alleviate the above problems, an enhanced encoding method is introduced herein.

A method according to a first aspect comprises encoding an input picture into a coded constituent picture; reconstructing, as a part of said encoding, a decoded constituent picture corresponding to the coded constituent picture; encoding a spatial region into a coded tile, the encoding comprising: determining a horizontal offset and a vertical offset indicative of a region-wise anchor position of the spatial region within the decoded constituent picture; encoding the horizontal offset and the vertical offset; determining that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region; indicating that the prediction unit is predicted relative to a prediction-unit anchor position that is relative to the horizontal and vertical offset; deriving a prediction-unit anchor position equal to sum of the first horizontal coordinate and the horizontal offset, and the first vertical coordinate and the vertical offset, respectively;

determining a motion vector for the prediction unit; and applying the motion vector relative to the prediction-unit anchor position to obtain a prediction block.

According to an embodiment, the method further comprises extracting the spatial region from the input picture; and determining the horizontal offset and the vertical offset on the basis of a location of the spatial region within the input picture.

According to an embodiment, the input picture represent a first view and the method further comprises obtaining the spatial region from a second input picture representing a second view that is different from the first view.

According to an embodiment, the first coded picture comprises the constituent picture and the coded tile, the method further comprises determining the motion vector to be zero; and indicating that the first coded picture is a reference picture for the motion vector.

According to an embodiment, a first coded picture comprises the constituent picture and a second coded picture comprises the coded tile, and the method comprises indicating that the first coded picture is a reference picture for the motion vector.

According to an embodiment, said indicating comprises determining the motion vector such that applying the motion vector relative to a position of the prediction unit causes derivation of the prediction block to use at least one sample outside the coded tile.

The second and the third aspects relate to an apparatus and a computer readable storage medium stored with code thereon, which are arranged to carry out the above method and one or more of the embodiments related thereto.

The fourth aspect relates to a method comprising decoding a coded tile into a decoded tile, the decoding comprising: decoding a horizontal offset and a vertical offset; decoding an indication that a prediction unit at position of a first horizontal coordinate and a first vertical coordinate of the coded tile is predicted relative to a prediction-unit anchor position that is relative to the horizontal and vertical offset; deriving a prediction-unit anchor position equal to sum of the first horizontal coordinate and the horizontal offset, and the first vertical coordinate and the vertical offset, respectively; determining a motion vector for the prediction unit;

and applying the motion vector relative to the prediction-unit anchor position to obtain a prediction block.

The fifth and the sixth aspects relate to an apparatus and a computer readable storage medium stored with code thereon, which are arranged to carry out the above method and one or more of the embodiments related thereto.

BRIEF DESCRIPTION OF THE DRAWINGS

For better understanding of the present invention, reference will now be made by way of example to the accompanying drawings in which:

FIGS. 11a and 11b show an example of encoding two bitstreams and switching between them according to SP-CILP encoding;

FIG. 18 shows an example of an arrangement for stereo coding according to an embodiment of the invention;

FIG. 19 shows another example of an arrangement for stereo coding according to an embodiment of the invention;

DETAILED DESCRIPTION OF SOME EXAMPLE EMBODIMENTS

Figure 1:
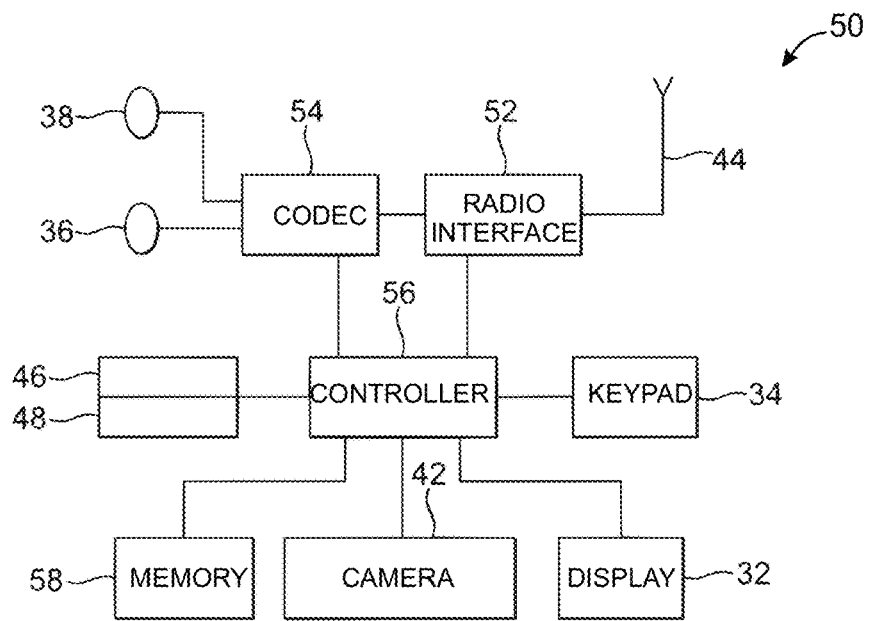
FIG. 1 shows schematically an electronic device employing embodiments of the invention.
Figure 2:
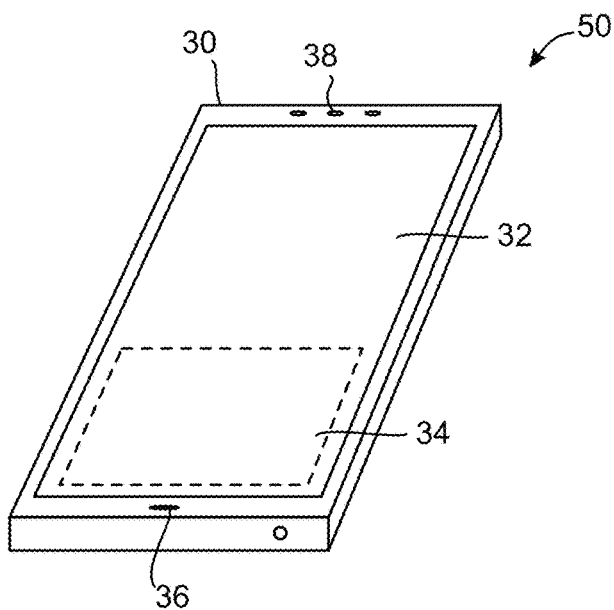
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
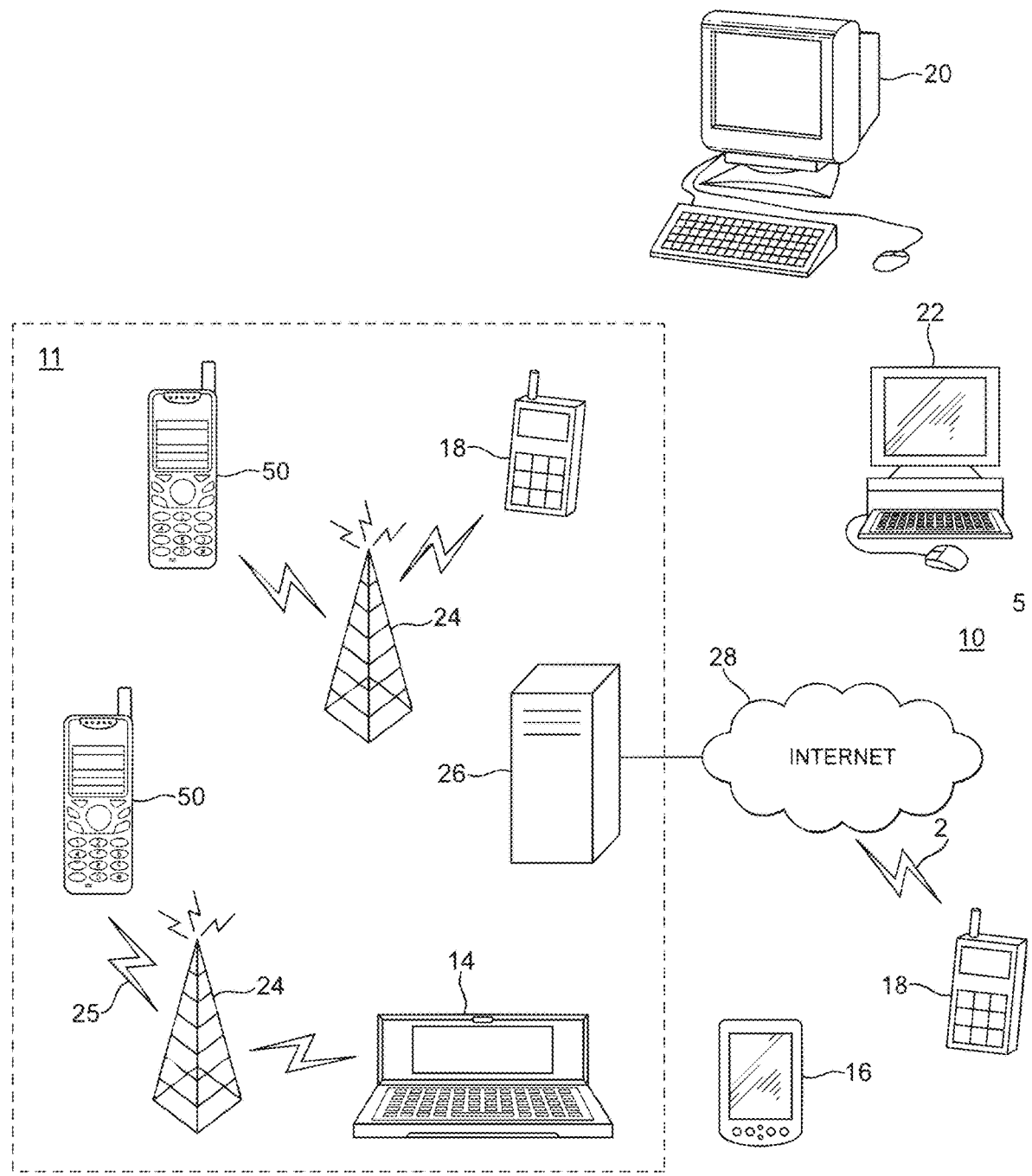
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
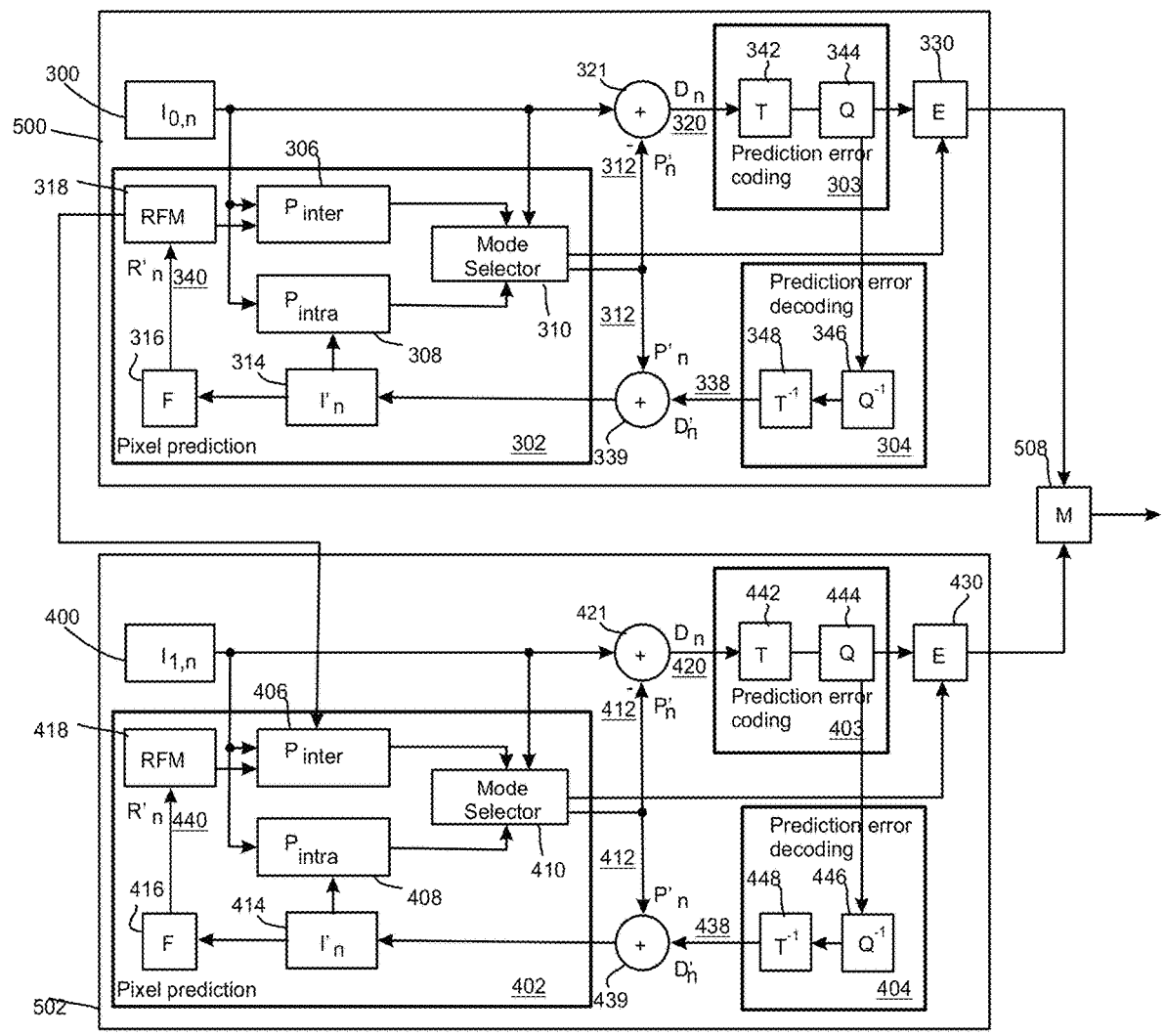
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414.

The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
   Luma and two chroma (YCbCr or YCgCo).
   Green, Blue and Red (GBR, also known as RGB).
   Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
   In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other picturesin the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighbouring prediction blocks sharing identical motion information, which is only signalled once for each region.

An example of the operation of advanced motion vector prediction is provided in the following, while other similar realizations of advanced motion vector prediction are also possible for example with different candidate position sets and candidate locations with candidate position sets. It also needs to be understood that other prediction mode, such as the merge mode, may operate similarly. Two spatial motion vector predictors (MVPs) may be derived and a temporal motion vector predictor (TMVP) may be derived. They may be selected among the positions: three spatial motion vector predictor candidate positions located above the current prediction block ($B_0$, $B_1$, $B_2$) and two on the left ($A_0$, $A_1$). The first motion vector predictor that is available (e.g. resides in the same slice, is inter-coded, etc.) in a pre-defined order of each candidate position set, ($B_0$, $B_1$, $B_2$) or ($A_0$, $A_1$), may be selected to represent that prediction direction (up or left) in the motion vector competition. A reference index for the temporal motion vector predictor may be indicated by the encoder in the slice header (e.g. as a collocated_ref_idx syntax element). The first motion vector predictor that is available (e.g. is inter-coded) in a pre-defined order of potential temporal candidate locations, e.g. in the order ($C_0$, $C_1$), may be selected as a source for a temporal motion vector predictor. The motion vector obtained from the first available candidate location in the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate. The co-located picture may also be referred to as the collocated picture, the source for motion vector prediction, or the source picture for motion vector prediction.

Motion parameter types or motion information may include but are not limited to one or more of the following types:
  an indication of a prediction type (e.g. intra prediction, uni-prediction, bi-prediction) and/or a number of reference pictures;
  an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
  an indication of a reference picture type, such as a short-term reference picture and/or a long-term reference picture and/or an inter-layer reference picture (which may be indicated e.g. per reference picture)
  a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
  a horizontal motion vector component (which may be indicated e.g. per prediction block or per reference index or alike);
  a vertical motion vector component (which may be indicated e.g. per prediction block or per reference index or alike);
  one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
  coordinates of a block to which the motion parameters and/or motion information applies, e.g. coordinates of the top-left sample of the block in luma sample units;
  extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) or motion field compression is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A constituent picture may be defined as such part of an enclosing (de)coded picture that corresponds to a representation of an entire input picture. In addition to the constituent picture, the enclosing (de)coded picture may comprise other data, such as another constituent picture.

Frame packing may be defined to comprise arranging more than one input picture, which may be referred to as (input) constituent frames or constituent pictures, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

Inter-view sample prediction between the frame-packed constituent frames may be enabled with the intra block copy tool as follows. A first constituent frame representing a first view and a second constituent frame representing a second view of the same multiview (e.g. stereoscopic) content are frame-packed. Intra-block-copy prediction from the first constituent frame to the second constituent frame is enabled in encoding, but intra-block-copy prediction from the second constituent frame to the first constituent frame is disabled in encoding. Hence, inter-view sample prediction is essentially achieved by applying intra-block-copy prediction between constituent frames of different views. Compression efficiency is hence improved compared to coding of frame-packed multiview content without intra-block-copy prediction.

Terms 360-degree video or virtual reality (VR) video may be used interchangeably. They may generally refer to video content that provides such a large field of view that only a part of the video is displayed at a single point of time in typical displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a typical flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

Figure 5:
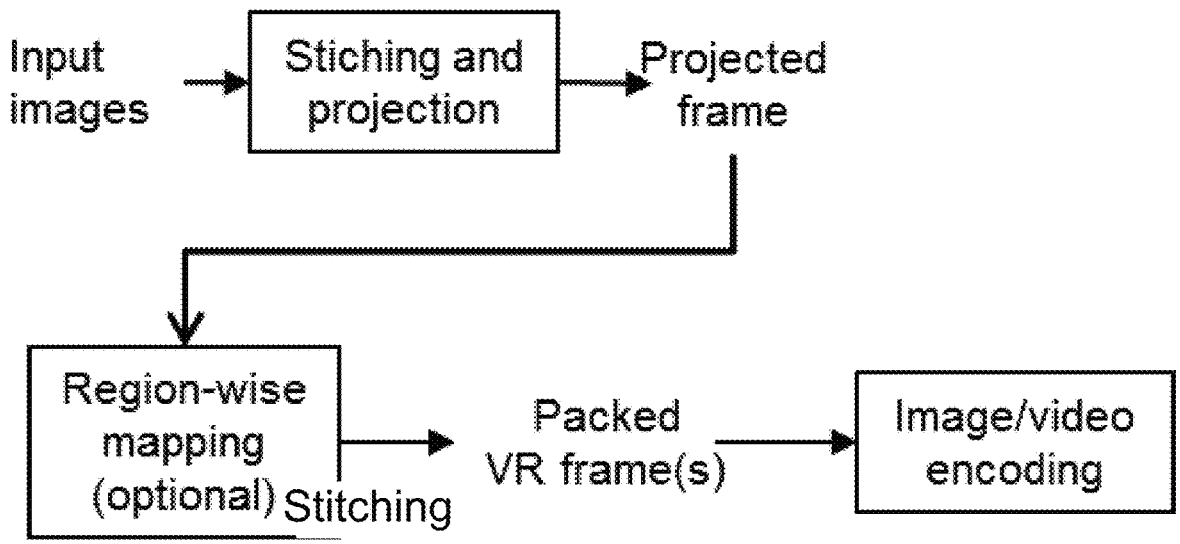
FIG. 5 shows an example of stitching, projecting and mapped images of the same time instance onto a packed virtual reality frame.

360-degree image or video content may be acquired and prepared for example as follows. Images or video can be captured by a set of cameras or a camera device with multiple lenses and sensors. The acquisition results in a set of digital image/video signals. The cameras/lenses typically cover all directions around the center point of the camera set or camera device. The images of the same time instance are stitched, projected, and mapped onto a packed VR frame. The breakdown of image stitching, projection, and mapping process is illustrated with FIG. 5 and described as follows. Input images are stitched and projected onto a three-dimensional projection structure, such as a sphere or a cube. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected frame can be formed. The image data on the projection structure is further arranged onto a two-dimensional projected frame. The term projection may be defined as a process by which a set of input images are projected onto a projected frame. There may be a pre-defined set of representation formats of the projected frame, including for example an equirectangular panorama and a cube map representation format.

Region-wise mapping (a.k.a. region-wise packing) may be applied to map projected frame onto one or more packed VR frames (a.k.a. packed pictures). In some cases, region-wise mapping may be understood to be equivalent to extracting two or more regions from the projected frame, optionally applying a geometric transformation (such as rotating, mirroring, and/or resampling) to the regions, and placing the transformed regions in spatially non-overlapping areas within the packed VR frame. If the region-wise mapping is not applied, the packed VR frame is identical to the projected frame. Otherwise, regions of the projected frame are mapped onto a packed VR frame by indicating the location, shape, and size of each region in the packed VR frame. The term mapping may be defined as a process by which a projected frame is mapped to a packed VR frame. The term packed VR frame may be defined as a frame that results from a mapping of a projected frame. In practice, the input images may be converted to a packed VR frame in one process without intermediate steps.

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed frame format, e.g. from a projected frame to a packed VR frame, as described earlier. The region-wise mapping information may for example comprise for each mapped region a source rectangle in the projected frame and a destination rectangle in the packed VR frame, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which VR projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

Region-wise quality ranking metadata may be present in or along a video or image bitstream. Quality ranking values of quality ranking regions may be relative to other quality ranking regions of the same bitstream or the same track or quality ranking regions of other tracks. Region-wise quality ranking metadata can be indicated for example by using the SphereRegionQualityRankingBox or the 2DRegionQualityRankingBox, which are specified as a part of MPEG Omnidirectional Media Format. SphereRegionQualityRankingBox provides quality ranking values for sphere regions, i.e., regions defined on sphere domain, while 2DRegionQualityRankingBox provides quality ranking values for rectangular regions on decoded pictures (and potentially a leftover region covering all areas not covered by any of the rectangular regions). Quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region may be defined to be approximately constant. In general, the boundaries of the quality ranking sphere or 2D regions may or may not match with the boundaries of the packed regions or the boundaries of the projected regions specified in region-wise packing metadata.

Figure 6:
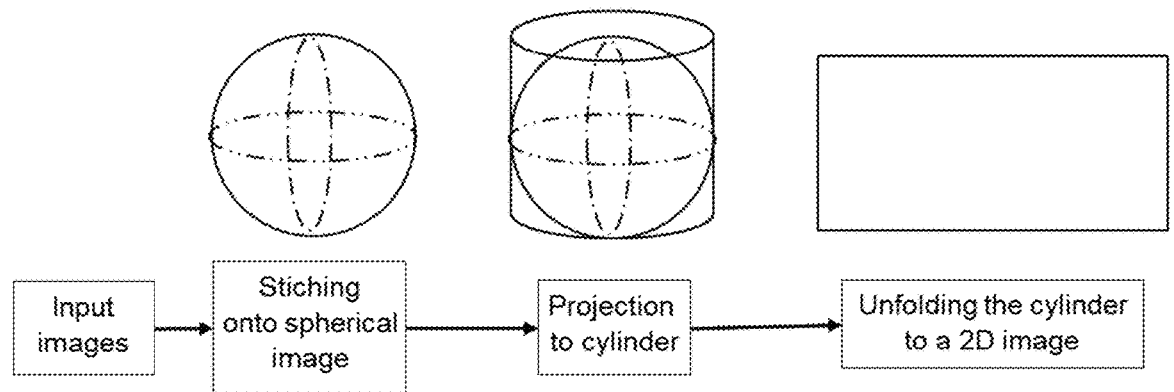
FIG. 6 shows a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that can be mapped to a bounding cylinder that can be cut vertically to form a 2D picture (this type of projection is known as equirectangular projection). The process of forming a monoscopic equirectangular panorama picture is illustrated in FIG. 6. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected frame. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of panoramic projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of panoramic projection format.

The human eyes are not capable of viewing the whole 360 degrees space, but are limited to a maximum horizontal and vertical FoVs (HHFoV, HVFoV). Also, a HMD device has technical limitations that allow only viewing a subset of the whole 360 degrees space in horizontal and vertical directions (DHFoV, DVFoV)).

At any point of time, a video rendered by an application on a HMD renders a portion of the 360 degrees video. This portion is defined here as Viewport. A viewport is a window on the 360 world represented in the omnidirectional video displayed via a rendering display. A viewport is characterized by horizontal and vertical FoVs (VHFoV, VVFoV). In the following, VHFoV and VVFoV will be simply abbreviated with HFoV and VFoV.

A viewport size may correspond to the HMD FoV or may have a smaller size, depending on the application. For the sake of clarity, we define as primary viewport the part of the 360 degrees space viewed by a user at any given point of time.

When a multi-layer bitstream, such as a layered HEVC bitstream, is stored in a file, such as an ISOBMFF file, it may be allowed to store of one or more layers into a track. For example, when a content provider wants to provide a multi-layer bitstream that is not intended for subsetting, or when the bitstream has been created for a few pre-defined sets of output layers where each layer corresponds to a view (such as 1, 2, 5, or 9 views), tracks can be created accordingly.

When a bitstream with multiple sub-layers (a.k.a. multi-sub-layer bitstream), such as an HEVC bitstream with multiple sub-layers, is stored in a file, such as an ISOBMFF file, it may be allowed to store of one or more sub-layers into a track and more than one track may be used to contain the bitstream. For example, a track may contain only certain sub-layers and need not contain the lowest sub-layer (e.g. the sub-layer with TemporalId equal to 0 in HEVC).

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. An extractor track may be defined as a track that contains one or more extractors.

A tile track specified in ISO/IEC 14496-15 enables storage of one or more temporal motion-constrained tile set as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the time-aligned samples of the tracks indicated by the 'sabt' track reference in the order of the track references.

A full-picture-compliant tile set {track|bitstream} is a tile set {track|bitstream} that conforms to the full-picture {track|bitstream} format. Here, the notation {optionA|optionB} illustrates alternatives, i.e. either optionA or optionB, which is selected consistently in all selections. A full-picture-compliant tile set track can be played as with any full-picture track using the parsing and decoding process of full-picture tracks. A full-picture-compliant bitstream can be decoded as with any full-picture bitstream using the decoding process of full-picture bitstreams. A full-picture track is a track representing an original bitstream (including all its tiles). A tile set bitstream is a bitstream that contains a tile set of an original bitstream but not representing the entire original bitstream. A tile set track is a track representing a tile set of an original bitstream but not representing the entire original bitstream.

A full-picture-compliant tile set track may comprise extractors as defined for HEVC. An extractor may for example an in-line constructor including a slice segment header and a sample constructor extracting coded video data for a tile set from a referenced full-picture track.

A sub-picture may be defined as a region, such as a tile or a tile rectangle, of a picture. A sub-picture track may be defined as a track that represents a sub-picture sequence, i.e. a region of a picture sequence and conforms to the a conventional track format, such as 'hvc1' or 'hev1' defined for HEVC in ISO/IEC 14496-15. In an approach to generate sub-picture tracks, a source picture sequence is split into sub-picture sequences before encoding. A sub-picture sequence is then encoded independently from other sub-picture sequences as a single-layer bitstream, such as HEVC Main profile bitstream. The coded single-layer bitstream is encapsulated into a sub-picture track. The bitstream for a sub-picture track may be encoded with motion-constrained pictures, as defined later. In another approach to generate sub-picture tracks, a source picture sequence is encoded with motion-constrained tile sets into a bitstream, a full-picture-compliant tile set bitstream is generated from the bitstream, and a sub-picture track is generated by encapsulating the full-picture-compliant tile set bitstream into a track. Sub-picture tracks generated this way comprise motion-constrained pictures.

A collector track may be defined as a track that extracts implicitly or explicitly MCTSs or sub-pictures from other tracks. A collector track may be a full-picture-compliant track. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. A tile base track may be regarded as a collector track, and an extractor track that extracts MCTSs or sub-pictures from other tracks may be regarded as a collector track. A collector track may also be referred to as a collection track. A track that is a source for extracting to a collector track may be referred to as a collection item track.

Inter-view prediction can provide a significant compression gain for stereoscopic and multiview video coding but is conventionally supported only in some profiles of video coding standards, such as the Multiview Main profile of HEVC. In constrained inter-view prediction, the encoding of stereoscopic or multiview video is constrained in a manner that the coded content can be rewritten so that one or more single-layer and single-view decoders can be used, such as HEVC Main profile decoder(s). Only a limited subset of pictures, such as IRAP pictures of HEVC, of an independent view may be selected to be used as reference pictures in encoding a predicted view. A single-layer and single-view bitstream may be generated for the predicted view by including the limited subset of pictures of the independent view into the bitstream of the predicted view. Rewriting of high-level syntax structures, such as parameter sets and slice headers, may be required when generating the single-layer and single-view bitstream of the predicted view. Full-picture-compliant tracks may be generated to guide in the rewriting, and may comprise extractors to include coded picture data of the limited subset of the independent view and may comprise in-line constructors for rewriting high-level syntax structures. The rewriting of the predicted view bitstream can be performed by resolving the full-picture-compliant tracks, i.e. by resolving extractors and in-line constructors therein.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

In many video communication or transmission systems, transport mechanisms, and multimedia container file formats, there are mechanisms to transmit or store a scalability layer separately from another scalability layer of the same bitstream, e.g. to transmit or store the base layer separately from the enhancement layer(s). It may be considered that layers are stored in or transmitted through separate logical channels. For example in ISOBMFF, the base layer can be stored as a track and each enhancement layer can be stored in another track, which may be linked to the base-layer track using so-called track references.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, $2^{nd}$ Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 7:
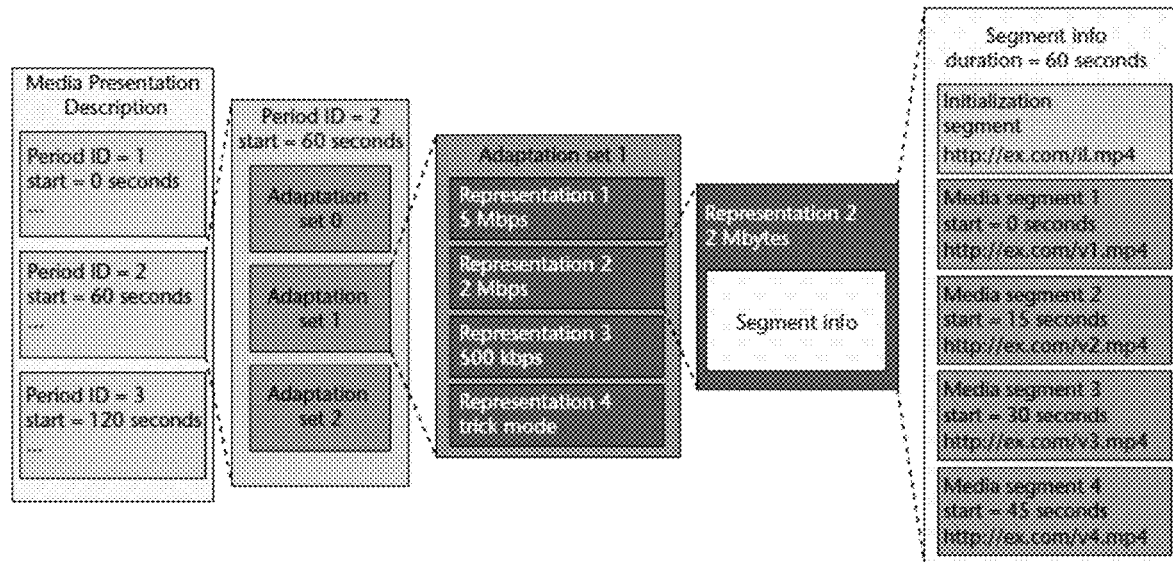
FIG. 7 shows an example of a hierarchical data model used in DASH.

In DASH, hierarchical data model is used to structure media presentation as shown in FIG. 7. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

Segments (or respectively Subsegments) may be defined to be non-overlapping as follows: Let $T_E(S,i)$ be the earliest presentation time of any access unit in stream i of a Segment or Subsegment S, and let $T_L(S,i)$ be the latest presentation time of any access unit in stream i of a Segment or Subsegment S. Two segments (respectively Subsegments), A and B, which may or may not be of different Representations, may be defined to be non-overlapping, when $T_L(A,i)<T_E(B,i)$ for all media streams i in A and B or if $T_L(B,i)<T_E(A,i)$ for all streams i in A and B where i refers to the same media component.

MPEG-DASH defines segment-container formats for both ISO Base Media File Format and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other levell elements and padding. A Segment Index of DASH may comprise a Cues Element of Matroska.

DASH specifies different timelines including Media Presentation timeline and Segment availability times. The former indicates the presentation time of access unit with a media content which is mapped to the global common presentation timeline. Media Presentation timeline enables DASH to seamlessly synchronize different media components which is encoded with different coding techniques and shares a common timeline. The latter indicates a wall-clock time and is used to signal clients the availability time of Segments which is identified by HTTP URLs. A DASH client is able to identify an availability time of a certain Segment by comparing the wall-clock time to the Segment availability time assigned to that Segment. Segment availability time plays a key role in live delivery of media Segments, referred as live service. For live service, the Segment availability time is different from Segment to Segment and a certain Segment's availability time depends on the position of the Segment in the Media Presentation timeline. For on-demand service, the Segment availability time is typically the same for all Segments.

DASH supports rate adaptation by dynamically requesting Media Segments from different Representations within an Adaptation Set to match varying network bandwidth. Switching between Representations of different bitrates may be used for example to match the transmitted bitrate to the expected network throughput and/or to avoid congestion in the network. When a DASH client switches up/down Representation, coding dependencies within Representation have to be taken into account. Conventionally, a Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

A content provider may create Segment and Subsegment of multiple Representations in a way that makes switching simpler. In a simple case, each Segment and Subsegment starts with a SAP and the boundaries of Segment and Subsegment are aligned across the Representation of an Adaptation Set. In such a case a DASH client is able to switch Representations without error drift by requesting Segments or Subsegments from an original Representation to a new Representation. In DASH, restrictions to construct Segment and Subsegment are specified in MPD and Segment Index in order to facilitate a DASH client to switch Representations without introducing an error drift. One of the usages of profile specified in DASH is to provide different levels of restrictions to construct Segments and Subsegments.

The draft MPEG-DASH specification includes tat feature of Segment Independent SAP Signaling (SISSI), which enables signaling of Segments starting with SAP having uneven durations. The draft MPEG-DASH specification defines SISSI signaling for switching within an Adaptation Set and across Adaptation Sets.

In switching within an Adaptation Set, the switching refers to the presentation of decoded data from one Representation up to a certain time t, and presentation of decoded data of another Representation from time t onwards. If Representations are included in one Adaptation Set, and the client switches properly, the Media Presentation is expected to be perceived seamless across the switch. Clients may ignore Representations that rely on codecs or other rendering technologies they do not support or that are otherwise unsuitable.

The Switching element as defined in Table 1 provides instructions of switch points within an Adaptation Set and the permitted switching options as defined in Table 2. This element may be used instead of the attributes @segmentAlignment or @bitstreamSwitching.

TABLE 1

Switch Point Signalling

| Element or Attribute Name | Use | Description |
| --- | --- | --- |
| Switching | | Switching logic description for the associated Representation |
| @interval | M | specifies the interval between two switching points in the scale of the @timescale on Representation level. Any Segment for which |

TABLE 1-continued

Switch Point Signalling

| Element or Attribute Name | Use | Description |
|---|---|---|
| | | the earliest presentation time minus the @t value of the S element describing the segment is an integer multiple of the product of @timescale and @interval is a switch-to opportunity, i.e. it enables to switch to this Representation with the switching strategy as defined by the @type value. The value may be such that it is aligned with the values in the Segment Timeline, i.e. a multiple of the value of the @d attribute. |
| @type | OD default: 'media' | specifies the switching strategy for the switch points identified in by the @interval attribute. Switching strategies are defined in Table 2. |

Table 2 defines different switching strategies that provide instructions to the client on the procedures to switch appropriately within an Adaptation Set.

TABLE 2

Switching Strategies

| Type | Description |
|---|---|
| media | Media level switching: In this case switching is possible at the switch point by decoding and presenting switch-from Representation up to switch point t, initializing the switch-to Representation with the associated Initialization Segment and continue decoding and presenting the switch-to Representation from time t onwards. |
| bitstream | Bitstream switching: In this case switching is possible at the switch point by decoding and presenting switch-from Representation up to switch point t, and continue decoding and presenting the switch-to Representation from time t onwards. Initialization of the switch-to Representation is not necessary and is not recommended. |

Random Access may refer to start processing, decoding and presenting the Representation from the random access point at time t onwards by initializing the Representation with the Initialization Segment, if present and decoding and presenting the Representation from the signaled Segment onwards, i.e. from the earliest presentation time of the signaled Segment. Random Access point may be signaled with the RandomAccess element as defined in Table 3.

TABLE 3

Random Access Point Signalling

| Element or Attribute Name | Use | Description |
|---|---|---|
| RandomAccess | | Random Access Information |
| @interval | M | specifies the position of the random access points in the Representations The information is specified in the scale of the @timescale on Representation level. Any Segment for which the earliest presentation time minus the @t value of the S element describing the segment is an integer multiple of the product of @timescale and @interval is a random access opportunity, i.e. it enables randomly access to this Representation with the random access strategy as defined by the @type value. The value should be such that it is aligned with the values in the Segment Timeline, i.e. a multiple of the value of the @d attribute. |
| @type | OD default: "closed" | specifies the random access strategy for the random access points in by the @interval attribute. The value uses a type present in Table 4. If the value of the type is unknown, the DASH client is expected to ignore the containing Random Access element. |

TABLE 3-continued

Random Access Point Signalling

| Element or Attribute Name | Use | Description |
|---|---|---|
| @minBufferTime | O | specifies a common duration used in the definition of the Representation data rate (using the @bandwidth attribute). If not present, then the value of the MPD level is inherited. |
| @bandwidth | O | Consider a hypothetical constant bitrate channel of bandwidth with the value of this attribute in bits per second (bps). Then, if the Representation is continuously delivered at this bitrate, starting at any RAP indicated in this element a client can be assured of having enough data for continuous playout providing playout begins after @minBufferTime * @bandwidth bits have been received (i.e. at time @minBufferTime after the first bit is received). For dependent Representations this value specifies the bandwidth according to the above definition for the aggregation of this Representation and all complementary Representations. If not present, the value of the Representation is inherited. |

TABLE 4

Random Access Type Values

| Type | Informative description |
|---|---|
| closed | Closed GOP random access. This implies that the segment is a Random Access Segment as well as the segment starts with a SAP type of 1 or 2. Note that SAP type 1 or 2 is a necessary condition, but not sufficient. In addition, all requirements of a Random Access Segment need to be fulfilled. |
| open | Open GOP random access. This implies that the segment is a Random Access Segment as well as the segment starts with a SAP type of 1, 2 or 3. Note that SAP type 1, 2 or 3 is a necessary condition, but not sufficient. In addition, all requirements of a Random Access Segment need to be fulfilled. |
| gradual | Gradual decoder refresh random. This implies that the segment is a Random Access Segment as well as the segment starts with a SAP type of 1, 2, 3 or 4. Note that SAP type 1 2, 3 or 4 is a necessary condition, but not sufficient. In addition, all requirements of a Random Access Segment need to be fulfilled. |

The DASH standard includes mechanisms to enable fast start-up of a media session. For example, the MPD may announce more than one representation, with different bitrates, in an Adaptation Set. Moreover, each segment and/or subsegment could start with a stream access point, where the pictures within the segment and/or subsegment are coded without referencing to any other picture from a different segment. This way a DASH client may start with a lower bitrate representation in order to increase the buffer occupancy level quickly. Then the client may then switch to requesting segment(s) and/or subsegment(s) of a higher bit rate representation (which may have e.g. a higher spatial resolution than the representation received earlier). The client may target to reach a certain buffer occupancy level, e.g. in terms of media duration, during the fast start-up and may target to keep the same or similar buffer occupancy level during the operation after a fast start-up phase. The client may start media playback after initiating a media streaming session and/or after a random access operation only after a certain amount of media has been buffered. This amount of media may be equal to but need not relate to the buffer occupancy level that is targeted to be reached at fast start-up. In all cases, the fast start-up may enable the client to start the media playback faster than would be possible if only a higher bitrate representation would be consistently received after initiating a media streaming session and/or after a random access operation.

As described above, the client or player may request Segments or Subsegments to be transmitted from different representations similarly to how the transmitted layers and/or sub-layers of a scalable video bitstream may be determined. Terms representation down-switching or bitstream down-switching may refer to requesting or transmitting a lower bitrate representation than what was requested or transmitted (respectively) previously. Terms representation up-switching or bitstream up-switching may refer to requesting or transmitting a higher bitrate representation than what was requested or transmitted (respectively) previously. Terms representation switching or bitstream switching may refer collectively to representation or bitstream up- and down-switching and may also or alternatively cover switching of representations or bitstreams of different viewpoints.

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient.

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

A DASH Preselection defines a subset of media components of an MPD that are expected to be consumed jointly by a single decoder instance, wherein consuming may comprise decoding and rendering. The Adaptation Set that contains the main media component for a Preselection is referred to as main Adaptation Set. In addition, each Preselection may include one or multiple partial Adaptation Sets. Partial Adaptation Sets may need to be processed in combination with the main Adaptation Set. A main Adaptation Set and partial Adaptation Sets may be indicated by one of the two means: a preselection descriptor or a Preselection element.

Streaming systems similar to MPEG-DASH include for example HTTP Live Streaming (a.k.a. HLS), specified in the IETF RFC 8216. As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName=AttributeValue. Hence, tags of HLS M3U8 files may be considered similar to Elements in MPD or XML, and attributes of HLS M3U8 files may be considered similar to Attributes in MPD or XML. Media segments in HLS may be formatted according to the MPEG-2 Transport Stream and contain a single MPEG-2 Program. Each media segment is recommended to start with a Program Association Table (PAT) and a Program Map Table (PMT). Media segments in later versions of HLS may be compliant with ISOBMFF.

An encapsulated bitstream may be defined as a media bitstream, such as a video bitstream (e.g. an HEVC bitstream), that is stored in a container file or (Sub)segment(s) and may be considered to comprise the file format metadata, such as boxes of ISOBMFF.

As explained above, DASH and other similar streaming systems provide a protocol and/or formats for multimedia streaming applications, especially for multiview coded video bitstreams. A recent trend in streaming in order to reduce the streaming bitrate of VR video is the following: a subset of 360-degree video content covering the primary viewport (i.e., the current view orientation) is transmitted at the best quality/resolution, while the remaining of 360-degree video is transmitted at a lower quality/resolution. There are generally two approaches for viewport-adaptive streaming:

1. Viewport-Specific Encoding and Streaming, a.k.a. Viewport-Dependent Encoding and Streaming, a.k.a. Asymmetric Projection.

In this approach, 360-degree image content is packed into the same frame with an emphasis (e.g. greater spatial area) on the primary viewport. The packed VR frames are encoded into a single bitstream.

Figure 8:
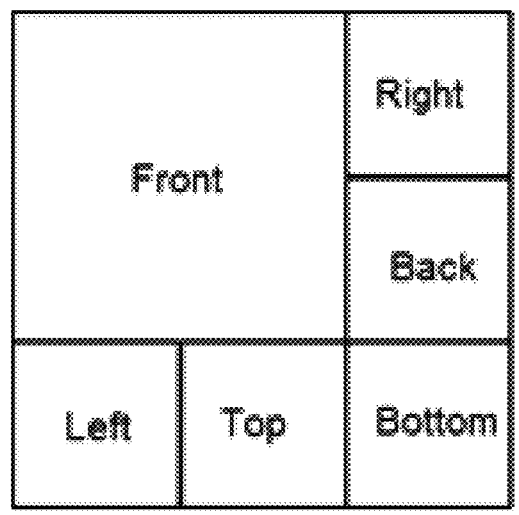
FIG. 8 shows an example of mapping a higher resolution sampled front face of a cube map on the same packed virtual reality frame as other cube faces.

For example, the front face of a cube map may be sampled with a higher resolution compared to other cube faces and the cube faces may be mapped to the same packed VR frame as shown in FIG. 8, where the front cube face is sampled with twice the resolution compared to the other cube faces.

2. Tile-Based Encoding and Streaming

In this approach, 360-degree content is encoded and made available in a manner that enables selective streaming of viewports from different encodings.

An approach of tile-based encoding and streaming, which may be referred to as tile rectangle based encoding and streaming or sub-picture based encoding and streaming, may be used with any video codec, even if tiles similar to HEVC were not available in the codec or even if motion-constrained tile sets or alike were not implemented in an encoder. In tile rectangle based encoding, the source content is split into tile rectangle sequences (a.k.a. sub-picture sequences) before encoding. Each tile rectangle sequence covers a subset of the spatial area of the source content, such as full panorama content, which may e.g. be of equirectangular projection format. Each tile rectangle sequence is then encoded independently from each other as a single-layer bitstream. Several bitstreams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In an example of tile rectangle based encoding and streaming, each cube face may be separately encoded and encapsulated in its own track (and Representation). More than one encoded bitstream for each cube face may be provided, e.g. each with different spatial resolution. Players can choose tracks (or Representations) to be decoded and played based on the current viewing orientation. High-resolution tracks (or Representations) may be selected for the cube faces used for rendering for the present viewing orientation, while the remaining cube faces may be obtained from their low-resolution tracks (or Representations).

In an approach of tile-based encoding and streaming, encoding is performed in a manner that the resulting bitstream comprises motion-constrained tile sets. Several bitstreams of the same source content are encoded using motion-constrained tile sets.

In an approach, one or more motion-constrained tile set sequences are extracted from a bitstream, and each extracted motion-constrained tile set sequence is stored as a tile set track (e.g. an HEVC tile track or a full-picture-compliant tile set track) in a file. A tile base track (e.g. an HEVC tile base track or a full picture track comprising extractors to extract data from the tile set tracks) may be generated and stored in a file. The tile base track represents the bitstream by implicitly collecting motion-constrained tile sets from the tile set tracks or by explicitly extracting (e.g. by HEVC extractors) motion-constrained tile sets from the tile set tracks. Tile set tracks and the tile base track of each bitstream may be encapsulated in an own file, and the same track identifiers may be used in all files. At the receiver side the tile set tracks to be streamed may be selected based on the viewing orientation. The client may receive tile set tracks covering the entire omnidirectional content. Better quality or higher resolution tile set tracks may be received for the current viewport compared to the quality or resolution covering the remaining, currently non-visible viewports.

In an example, equirectangular panorama content is encoded using motion-constrained tile sets. More than one encoded bitstream may be provided, e.g. with different spatial resolution and/or picture quality. Each motion-constrained tile set is made available in its own track (and Representation). Players can choose tracks (or Representations) to be decoded and played based on the current viewing orientation. High-resolution or high-quality tracks (or Representations) may be selected for tile sets covering the present primary viewport, while the remaining area of the 360-degree content may be obtained from low-resolution or low-quality tracks (or Representations).

In an approach, each received tile set track is decoded with a separate decoder or decoder instance.

In another approach, a tile base track is utilized in decoding as follows. If all the received tile tracks originate from bitstreams of the same resolution (or more generally if the tile base tracks of the bitstreams are identical or equivalent, or if the initialization segments or other initialization data, such as parameter sets, of all the bitstreams is the same), a tile base track may be received and used to construct a bitstream. The constructed bitstream may be decoded with a single decoder.

In yet another approach, a first set of tile rectangle tracks and/or tile set tracks may be merged into a first full-picture-compliant bitstream, and a second set of tile rectangle tracks and/or tile set tracks may be merged into a second full-picture-compliant bitstream. The first full-picture-compliant bitstream may be decoded with a first decoder or decoder instance, and the second full-picture-compliant bitstream may be decoded with a second decoder or decoder instance. In general, this approach is not limited to two sets of tile rectangle tracks and/or tile set tracks, two full-picture-compliant bitstreams, or two decoders or decoder instances, but applies to any number of them. With this approach, the client can control the number of parallel decoders or decoder instances. Moreover, clients that are not capable of decoding tile tracks (e.g. HEVC tile tracks) but only full-picture-compliant bitstreams can perform the merging in a manner that full-picture-compliant bitstreams are obtained. The merging may be solely performed in the client or full-picture-compliant tile set tracks may be generated to assist in the merging performed by the client.

It is also possible to combine the approaches 1. (viewport-specific encoding and streaming) and 2. (tile-based encoding and streaming) above.

It needs to be understood that tile-based encoding and streaming may be realized by splitting a source picture in tile rectangle sequences that are partly overlapping. Alternatively or additionally, bitstreams with motion-constrained tile sets may be generated from the same source content with different tile grids or tile set grids. We could then imagine the 360 degrees space divided into a discrete set of viewports, each separate by a given distance (e.g., expressed in degrees), so that the omnidirectional space can be imagined as a map of overlapping viewports, and the primary viewport is switched discretely as the user changes his/her orientation while watching content with a HMD. When the overlapping between viewports is reduced to zero, the viewports could be imagined as adjacent non-overlapping tiles within the 360 degrees space.

As explained above, in viewport-adaptive streaming the primary viewport (i.e., the current viewing orientation) is transmitted at the best quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP), which are typically aligned with (Sub)segments. In single-layer video bitstreams, SAPs are intra-coded and hence costly in terms of rate-distortion performance. Conventionally, relatively long SAP intervals and consequently relatively long (Sub)segment durations in the order of seconds are hence used. Thus, the delay (here referred to as the viewport quality update delay) in upgrading the quality after a viewing orientation change (e.g. a head turn) is conventionally in the order of seconds and is therefore clearly noticeable and annoying.

There are several alternatives to deliver the viewport-dependent omnidirectional video. It can be delivered, for example, as equal-resolution HEVC bitstreams with motion-constrained tile sets (MCTSs). Thus, several HEVC bitstreams of the same omnidirectional source content are encoded at the same resolution but different qualities and bitrates using motion-constrained tile sets. The MCTS grid in all bitstreams is identical. In order to enable the client the use of the same tile base track for reconstructing a bitstream from MCTSs received from different original bitstreams, each bitstream is encapsulated in its own file, and the same track identifier is used for each tile track of the same tile grid position in all these files. HEVC tile tracks are formed from each motion-constrained tile set sequence, and a tile base track is additionally formed. The client parses tile base track to implicitly reconstruct a bitstream from the tile tracks. The reconstructed bitstream can be decoded with a conforming HEVC decoder.

Clients can choose which version of each MCTS is received. The same tile base track suffices for combining MCTSs from different bitstreams, since the same track identifiers are used in the respective tile tracks.

Figure 9A:
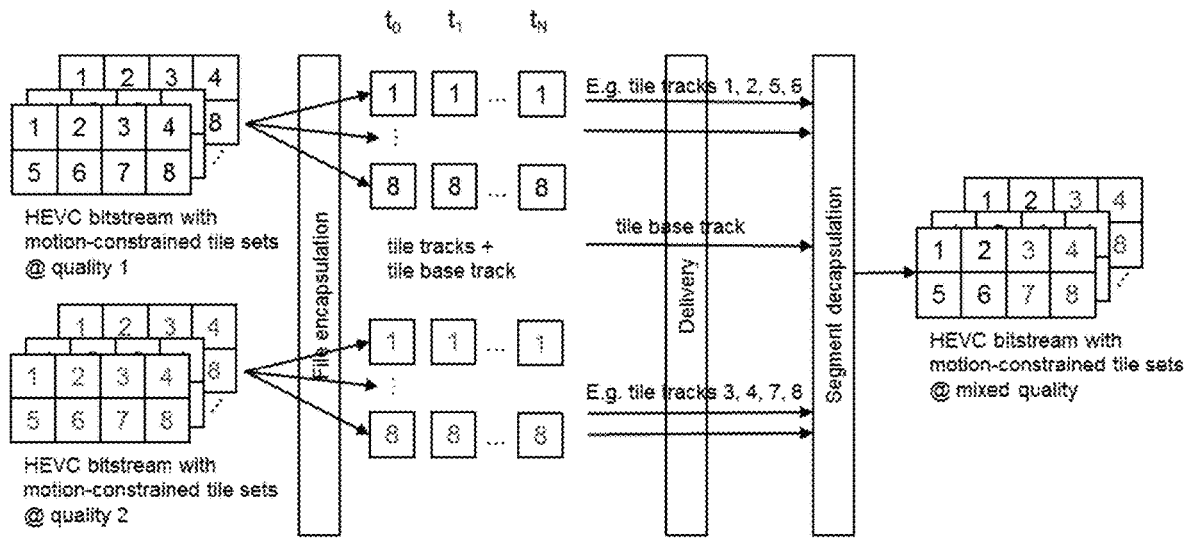
FIG. 9a shows an example of delivery of equal-resolution HEVC bitstreams with motion-constrained tile sets.

FIG. 9a shows an example how tile tracks of the same resolution can be used for tile-based omnidirectional video streaming. A 4×2 tile grid has been used in forming of the motion-constrained tile sets. Two HEVC bitstreams originating from the same source content are encoded at different picture qualities and bitrates. Each bitstream is encapsulated in its own file wherein each motion-constrained tile set sequence is included in one tile track and a tile base track is also included. The client chooses the quality at which each tile track is received based on the viewing orientation. In this example the client receives tile tracks 1, 2, 5, and 6 at a particular quality and tile tracks 3, 4, 7, and 8 at another quality. The tile base track is used to order the received tile track data into a bitstream that can be decoded with an HEVC decoder.

Figure 9B:
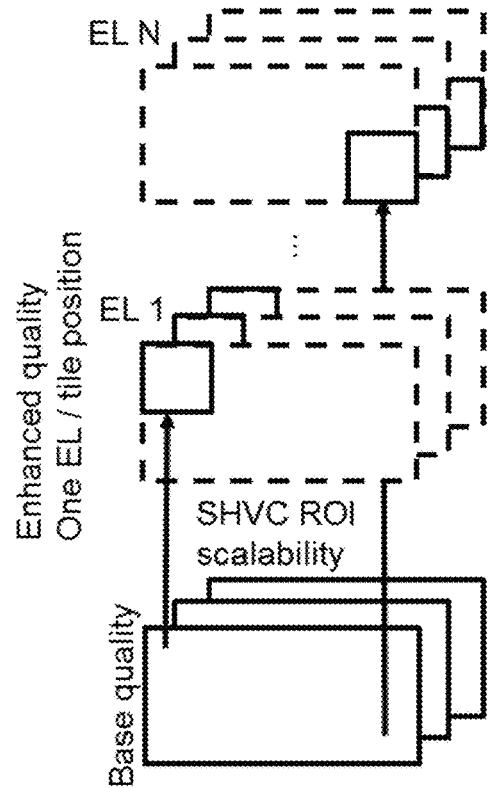
FIG. 9b shows an example of SHVC ROI scalability encoding.

Another option to deliver the viewport-dependent omnidirectional video is to carry out SHVC region-of interest scalability encoding. Therein, the base layer is coded conventionally. Additionally, region-of-interest (ROI) enhancement layers are encoded with SHVC Scalable Main profile. For example, several layers per each tile position can be coded, each for different bitrate or resolution. The ROI enhancement layers may be spatial or quality scalability layers. Several SHVC bitstreams can be encoded for significantly differing bitrates, since it can be assumed that bitrate adaptation can be handled to a great extent with enhancement layers only. This encoding approach is illustrated in FIG. 9b.

The base layer is always received and decoded. Additionally, enhancement layers (EL1, . . . , ELN) selected on the basis of the current viewing orientation are received and decoded.

Stream access points (SAPs) for the enhancement layers are inter-layer predicted from the base layer, and are hence more compact than similar SAPs realized with intra-coded pictures. Since the base layer is consistently received and decoded, the SAP interval for the base layer can be longer than that for ELs.

The SHVC ROI-based approach may also be implemented without inter-layer prediction, which is herein referred to as the no-ILP approach.

By comparing the performance of the tile-based approach (shown in FIG. 9a) to the SHVC ROI-based approach (shown in FIG. 9b), it has been observed that the bitrate of the SHVC ROI approach is significantly reduced (over 20% on average) compared to the bitrate of the tile-based approach. Thus, the SHVC ROI approach significantly outperforms MCTS-based viewport-dependent delivery in terms of bitrate reduction, and enabling inter-layer prediction provides a significant compression gain compared to using no inter-layer prediction.

However, the SHVC ROI approach has the some disadvantages. Inter-layer prediction is enabled only in codec extensions, such as the SHVC extension of HEVC. Such codec extensions might not be commonly supported in decoding, particularly when considering hardware decoder implementations. Moreover, the SHVC ROI approach as well as the no-ILP approach significantly increase the decoding complexity compared to the MCTS-based approach. For example, if a 4×2 tile grid is used, the enhancement layer in the SHVC ROI approach and in the no-ILP approach typically covers 2×2 tiles of the grid, i.e. causing 50% decoding complexity increase.

Figure 10:
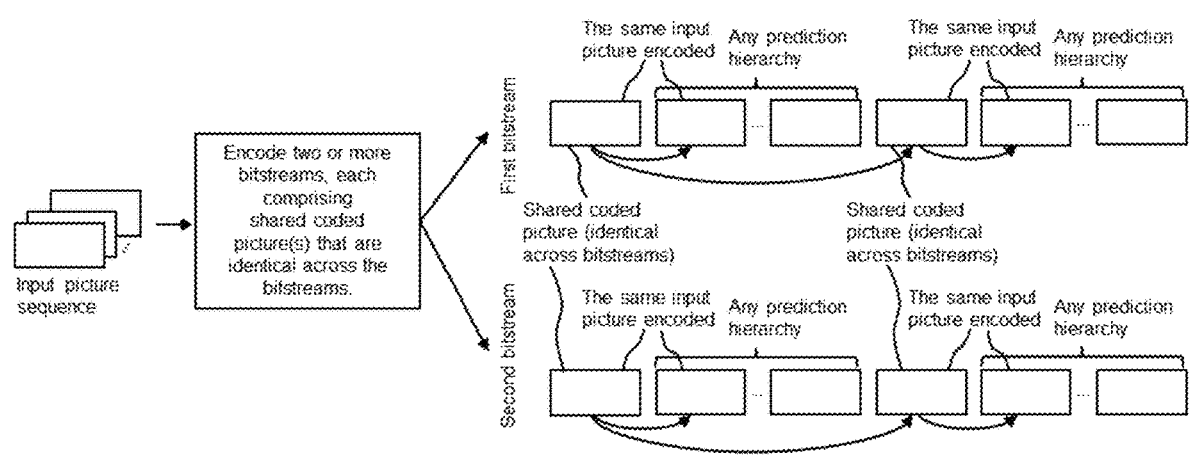
FIG. 10 shows an example of constrained inter-layer prediction (CILP) encoding.

Another method for enabling viewport-dependent delivery of omnidirectional video is called constrained inter-layer prediction (CILP). CILP is illustrated by referring to FIG. 10, which shows how the input picture sequence is encoded into two or more bitstreams, each representing the entire input picture sequence, i.e., the same input pictures are encoded in the bitstreams or a subset of the same input pictures, potentially with a reduced picture rate, are encoded in the bitstreams.

Certain input pictures are chosen to be encoded into two coded pictures in the same bitstream, the first referred to as a shared coded picture, and the two coded pictures may be referred to as a shared coded picture pair. A shared coded picture is either intra coded or uses only other shared coded pictures (or the respective reconstructed pictures) as prediction references. A shared coded picture in a first bitstream (of the encoded two or more bitstreams) is identical to the respective shared coded picture in a second bitstream (of the encoded two or more bitstreams), wherein "identical" may be defined to be identical coded representation, potentially excluding certain high-level syntax structures, such as SEI messages, and/or identical reconstructed picture. Any picture subsequent to a particular shared coded picture in decoding order is not predicted from any picture that precedes the particular shared coded picture and is not a shared coded picture.

A shared coded picture may be indicated to be a non-output picture. As a response to decoding a non-output picture indication, the decoder does not output the reconstructed shared coded picture. The encoding method facilitates decoding a first bitstream up to a selected shared coded picture, exclusive, and decoding a second bitstream starting from the respective shared coded picture. No intra-coded picture is required to start the decoding of the second bitstream, and consequently compression efficiency is improved compared to a conventional approach.

CILP enables the use of HEVC Main profile encoder and decoder, and hence has better compatibility with implementations than the SHVC ROI approach. Moreover, CILP takes advantage of relatively low intra picture frequency (similarly to the SHVC ROI approach). However, when compared to the SHVC ROI approach, CILP suffers from the use of MCTSs for the base-quality tiles. The streaming rate-distortion performance of CILP is close to that of SHVC-ROI in relatively coarse tile grids (up to 6×3). However, CILP has inferior streaming rate-distortion performance compared to SHVC-ROI when finer tile grids are used, presumably due to the use of MCTSs for the base quality.

Accordingly, the SHVC ROI and the CILP approaches have advantages over each other in different situations, but neither of them outperforms the other in all situations.

For better obtaining the advantages of both the SHVC ROI and the CILP, an encoding method called spatially packed constrained inter-layer prediction (SP-CILP) has been proposed.

In SP-CILP approach, an input picture sequence is encoded into a bitstream such that a picture area is divided into a first constituent picture area and a first tile area that are non-overlapping within the picture area. The constituent picture area is used to carry the base quality encoding, and the tile area is used to carry enhanced quality tiles. In order to enable prediction of enhanced quality tiles from the time-aligned base-quality constituent picture in a similar manner as in the SHVC ROI and CILP approaches, certain input pictures may be encoded as two coded pictures. In the first coded picture of these two coded picture, the tile area may be blank. In the second coded picture of these two coded pictures, the tile area may be predicted from the base-quality constituent picture of the first coded picture. The constituent picture area of the second coded picture may be blank, or it may be coded with reference to the first coded picture with zero motion and without prediction error (i.e. "skip coded").

In practice, several (at least two) bitstreams are encoded, each with different selection of enhanced quality tiles, but with the same base-quality constituent pictures. For example, when the 4×2 tile grid is used and four tiles are selected to be coded at enhanced quality matching a viewing orientation, about 40 bitstreams may need to be coded for different selection of enhanced quality tiles. The IRAP picture interval may be selected to be longer than the interval of coding an input picture as two coded pictures as described above. FIG. 11a shows an example, where two bitstreams are encoded, wherein "b" refers to a blank tile, as described above, and "B-slices" comprise at least one B- or P-slice and may additionally comprise any other slices, e.g. I-, P-, or B-slices.

Coding an input picture as two coded pictures as described above forms a switching point that enables switching from one bitstream to another. Since the base-quality constituent picture is identical in the encoded bitstreams, the base-quality constituent picture at the switching point can be predicted from earlier picture(s). Continuing the example of FIG. 11a, FIG. 11b shows an example of switching from enhanced quality tiles 1,2,5,6 to 3,4,7,8 at the first non-IRAP switching point.

As a result, a viewport-dependent delivery of omnidirectional video is achieved which can be both encoded and decoded with a single-layer encoder/decoder, such as HEVC Main profile encoder/decoder. Thus, similar advantages as with CILP are achieved. Moreover, intra pictures can be coded infrequently for the base quality, but still enable yet frequent viewpoint switching capability, similarly to the advantages of SHVC ROI and CILP. On the other hand, the use of MCTSs for the base quality is avoided, thereby improving the compression performance for the base quality coding similarly to SHVC ROI. Also streaming rate-distortion compression gain is achieved similarly to SHVC ROI.

However, in the SP-CILP approach spatially adjacent and/or temporally collocated motion vectors in enhanced quality tiles may have significantly different magnitude. For motion vector prediction, a smooth motion field would be more beneficial. Also the number of encoded bitstreams required for SP-CILP is proportional to the number of distinct combinations to select high-resolution or high-quality tiles, respectively. While only one track for the base-quality constituent picture sequence needs to be stored, one tile track per each pair of the tile's position in the original picture and the tile's position in the extractor track is required. Moreover, the selection of enhanced quality tiles for SP-CILP encoding is done based on an assumption of a (maximum) field-of-view that needs to be supported in the viewport(s) in playback devices. If the field-of-views of the viewports that are supported in a service has a large variation, separate encodings for different viewport field-of-view sizes need to be done.

Now an improved method for enabling viewport-dependent delivery of omnidirectional video and/or for multiview video coding is introduced.

Figure 12:
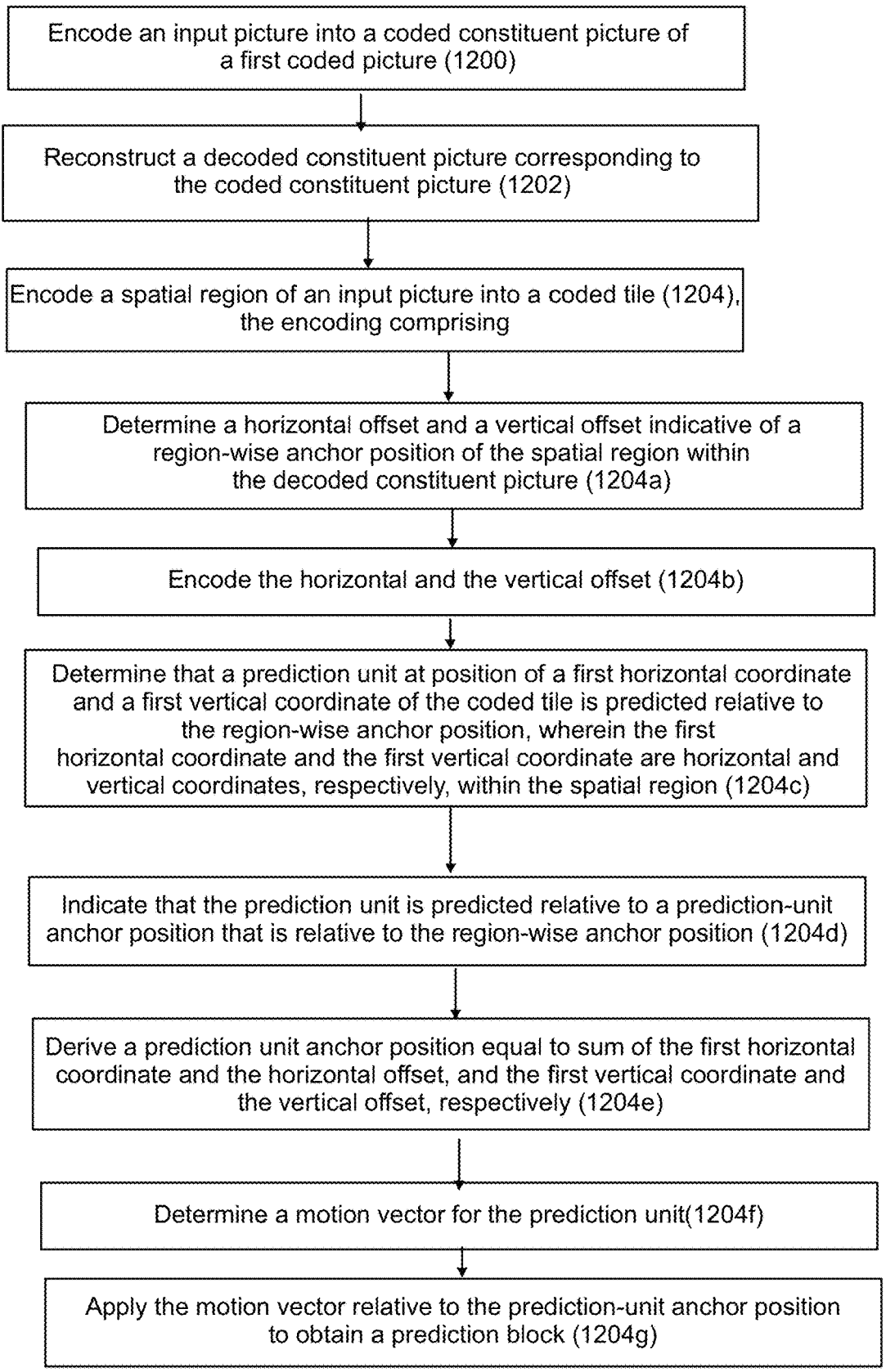
FIG. 12 shows a flow chart of an encoding method according to an embodiment of the invention.

The method, which is shown in FIG. 12, comprises encoding (1200) an input picture into a coded constituent picture; reconstructing (1202), as a part of said encoding, a decoded constituent picture corresponding to the coded constituent picture; encoding (1204) a spatial region into a coded tile, the encoding comprising: determining (1204a) a horizontal offset and a vertical offset indicative of a region-wise anchor position of the spatial region within the decoded constituent picture; encoding (1204b) the horizontal offset and the vertical offset; determining (1204c) that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region; indicating (1204d) that the prediction unit is predicted relative to a prediction-unit anchor position that is relative to the region-wise anchor position; deriving (1204e) a prediction-unit anchor position equal to sum of the first horizontal coordinate and the horizontal offset, and the first vertical coordinate and the vertical offset, respectively; determining (1204f) a motion vector for the prediction unit; and applying (1204g) the motion vector relative to the prediction-unit anchor position to obtain a prediction block.

In an embodiment that is applicable to viewport-dependent delivery of omnidirectional video, the spatial region originates from the input picture, and the region-wise anchor position corresponds to the position of the spatial region within the input picture.

Consequently, one or more versions of the same content are encoded, differentiated e.g. by the bitrate. The encoded pictures comprise a constituent picture that represents the entire field of view of the content. The constituent picture may, for example, comprise a picture of equirectangular projection representing the entire sphere. In this context, the constituent picture may be called the base-quality constituent picture or the shared constituent picture, since if there are many versions of the same content, the shared constituent picture may be coded identically in all of them, and hence the shared constituent picture may be identical regardless of which coded version is decoded.

The encoded pictures also comprise tiles of the same content that may but are not required to represent the entire field of view of the content. The tiles typically have higher quality compared to that of the respective shared constituent picture.

In an embodiment that is applicable to multiview video coding, the spatial region originates from a second input picture, representing a different view than the input picture. The spatial region may for example comprise an entire second input picture. The region-wise anchor position may for example be determined on the basis of an average or global disparity between the input picture and the second input picture. The region-wise anchor position may for example correspond to a position of a the spatial region on the input picture assuming that the content of the spatial region is on a background distance or on average distance of the scene. This embodiment helps in improving compression efficiency when inter-view prediction for frame-packed multiview video is enabled through intra block copy prediction. Particularly when inter-view prediction is selected in the current prediction unit and there are no neighboring prediction units using inter-view prediction (but rather all of them use temporal prediction or intra coding), the embodiment is likely to make the needed motion vector difference smaller and hence improve compression.

In an embodiment that is applicable to any video coding, the spatial region is a second input picture, representing a different time that the input picture. The constituent picture may be encoded as a first coded picture and the spatial region may be encoded as a second coded picture. The region-wise anchor position may for example be determined on the basis of global motion between the input picture and the second input picture. For example, in case of camera panning, the region-wise anchor position may for example correspond to the magnitude and direction of panning between the input pictures. This embodiment may help in improving compression efficiency. It is noted that the horizontal offset and/or the vertical offset may be allowed to be outside constituent picture boundaries and/or prediction-unit anchor positions may be allowed to be outside constituent picture boundaries.

In the following, some embodiments are described with reference to terms such as shared constituent picture and/or enhanced quality tile. While these terms relate to the embodiment related to viewport-dependent delivery, it needs to be understood that the embodiments can be equally used to other usage scenarios, such the embodiment related to multiview coding by replacing the terms with more generic ones (e.g., constituent picture rather than shared constituent picture, and/or coded tile rather than enhanced quality tile). It should be understood that embodiments may also be applied to other usage scenarios than described herein.

Herein, a motion vector anchor position is defined as a position (e.g. horizontal and vertical coordinates) within a picture area relative to which the motion vector is applied. Conventionally, the motion vector anchor position is the same as the position of the prediction unit for which the motion vector is provided.

In an embodiment, the encoding of the coded constituent picture is constrained such that motion vectors do not cause references to samples outside the coded constituent picture (or the respective decoded constituent picture) in the prediction processes. Otherwise, the coding and decoding of the coded constituent picture may be performed conventionally.

In an embodiment, the encoding of the coded constituent picture may cause references outside picture boundaries but is constrained such that motion vectors do not cause references to samples within picture boundaries but outside the constituent picture boundaries. Otherwise, the coding and decoding of the coded constituent picture may be performed conventionally.

Figure 13:
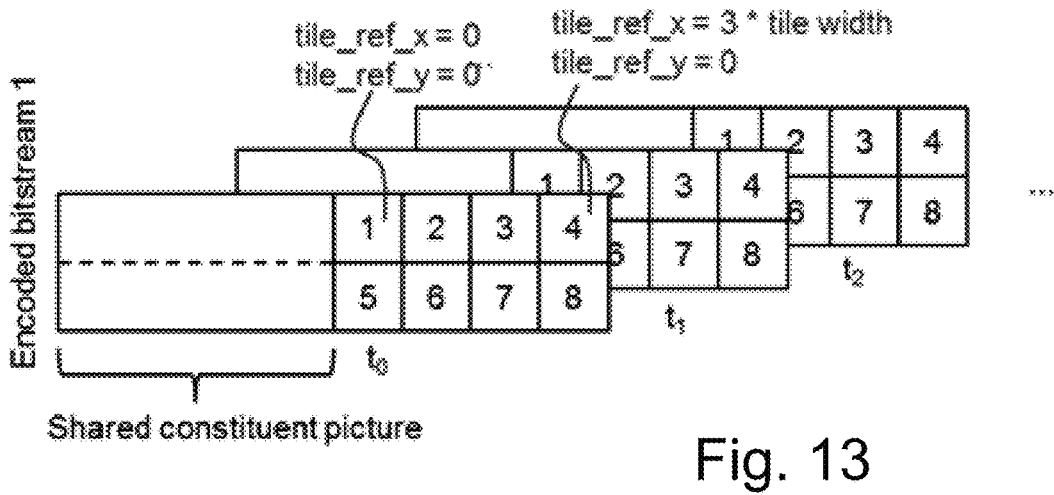
FIG. 13 shows an example of the encoding method according to an embodiment of the invention.

FIG. 13 illustrates one possible coding arrangement, where the coding and decoding of the tiles (enumerated 1 to 8 in the example figure above) is performed as follows.

When the use of anchor position offset is enabled, a horizontal offset and a vertical offset for the anchor position (tile_ref_x, tile_ref_y) are given in the slice header, slice parameter set, tile header, tile parameter set, or alike. tile_ref_x and tile_ref_y are indicative of the top-left corner of the tile within the shared constituent picture. In general, tile_ref_x and tile_ref_y may be indicative of any pre-defined or indicated reference location, such as the center point, of the tile within the shared constituent picture. tile_ref_x and tile_ref_y may be constrained to be indicative of a location within the shared constituent picture but in general may be indicative of a location that is beyond the boundaries of the shared constituent picture.

It may be pre-defined e.g. in a coding standard, or encoded by an encoder in the bitstream, and/or decoded by a decoder from the bitstream that tile_ref_x and tile_ref_y are relative to the top-left corner of the picture comprising the shared constituent picture. In this case, the encoder may select the values of tile_ref_x, tile_refLy and potential other parameters in a manner that tile_ref_x and tile_ref_y are indicative of the top-left corner of the top-left corner of the tile within the shared constituent picture. Alternatively, tile_ref_x and tile_ref_y are relative to a reference location for the shared constituent picture, and the reference location may be indicated by an encoder in the bitstream and/or decoded by a decoder from a bitstream, or inferred by an encoder and/or a decoder.

A particular coordinate system may be pre-defined or indicated for indicating locations and/or extents within a shared constituent picture and/or picture(s) containing the shared constituent picture. Herein, it is assumed that the coordinate system has the origin on the top-left corner of the shared constituent picture or the picture containing the shared constituent picture, the horizontal coordinates increase towards the right, and the vertical coordinates increase downwards. It needs to be understood that embodiments could be equivalently realized with other types of coordinate systems.

Let the top-left corner of the current tile have position (tile_x, tile_y) within the picture. Let the top-left corner of the current PU have position of a first horizontal coordinate and a first vertical coordinate (rel_x, rel_y) relative to the top-left corner of the current tile. Consequently, the motion vector anchor position is conventionally (tile_x+rel_x, tile_y+rel_y). The encoder may indicate, e.g. in a coded prediction unit, and/or the decoder may decode, e.g. from a coded prediction unit, that the motion vector anchor position is set equal to (tile_ref_x+rel_x, tile_ref_y+rel_y) for the prediction unit.

The signaling of the horizontal and vertical offset enables the tiles to be arranged at any position within the coded pictures that are decoded. In other words, the tiles in the encoded pictures need not have the same position as in the coded pictures that are decoded. This enables selective reconstruction of bitstreams from tiles as described with the file format amendments. Thus, the number of encoded bitstreams and stored enhanced quality tile tracks may be reduced when compared to those needed in SP-CILP.

According to an embodiment, when the reference picture is the current picture (i.e., when intra block copy is in use) and the motion vector is equal to (0, 0), the motion vector anchor position is set equal to (tile_ref_x+rel_x, tile_ref_y+rel_y). Consequently, the prediction block is the block in the shared constituent picture that spatially corresponds to the current block. This may be considered similar to inter-layer sample prediction in scalable video coding.

There are different ways of indicating that the motion vector anchor position (tile_ref_x+rel_x, tile_ref_y+rel_y) is in use. According to an embodiment, the encoder indicates, e.g. with a flag, for a slice or a tile that the motion vector anchor position offset mechanism is applied for all motion vectors of the slice or the tile, respectively. Likewise, according to an embodiment, the decoder decodes, e.g. from a flag, for a slice or a tile that the motion vector anchor position offset mechanism is applied for all motion vectors of the slice or the tile, respectively.

According to an embodiment, the encoder indicates, e.g. with a flag, for a slice or a tile that the motion vector anchor position offset mechanism is applied for all intra block copy motion vectors of the slice or the tile, respectively. According to an embodiment, the decoder decodes, e.g. with a flag, for a slice or a tile that the motion vector anchor position offset mechanism is applied for all intra block copy motion vectors of the slice or the tile, respectively.

According to an embodiment, the encoder indicates, e.g. with a flag, for a slice or a tile that the motion vector anchor position offset mechanism is applied for all temporal motion vectors of the slice or the tile, respectively. According to an embodiment, the decoder decodes, e.g. with a flag, for a slice or a tile that the motion vector anchor position offset mechanism is applied for all temporal motion vectors of the slice or the tile, respectively.

According to an embodiment, the encoder indicates that the motion vector anchor position offset mechanism is enabled e.g. on a slice or tile level. Determination whether the motion vector anchor position offset is applied may still be performed e.g. on prediction unit basis. Likewise, according to an embodiment, the decoder decodes, e.g. from a slice or tile header, that the motion vector anchor position offset mechanism is enabled. The decoder may decode, e.g. for each prediction unit, whether the motion vector anchor position offset is applied.

According to an embodiment, the encoder indicates whether the motion vector anchor position offset is used e.g. in a coding unit or prediction unit. The indication may be for example a CABAC-coded flag. Likewise, according to an embodiment, the decoder decodes, e.g. from a coding unit or a prediction unit, whether the motion vector anchor position offset is used.

According to an embodiment, the encoder indicates that the prediction unit is predicted relative to an anchor position that is relative to the horizontal and vertical offset by determining the motion vector in a manner that it causes derivation of the prediction block to use at least one sample outside the tile. According to an embodiment, the decoder decodes concludes that the motion vector causes derivation of the prediction block to use at least one sample outside the tile, and consequently concludes that the prediction unit is predicted relative to an anchor position that is relative to the horizontal and vertical offset. These embodiments may be applied to enable motion vectors to refer over tile boundaries to achieve improved compression.

According to an embodiment, when the indication indicates that the anchor position offset is enabled and the reference picture is the current picture (i.e., when intra block copy is in use) and the motion vector causes the derivation of the prediction block to refer to samples that have not yet been encoded or decoded, the motion vector anchor position is set equal to (tile_ref_x+rel_x, tile_ref_y+rel_y).

Conventionally, tiles can be encoded in parallel (e.g. by different processor cores) and in many cases also decoded in parallel. In the embodiments (specifically those utilizing intra block copy) using motion vectors referring to the shared constituent picture from an enhanced-quality tile, the shared constituent picture and the tile need to be coded and decoded in a sequential manner. Several enhanced-quality tiles may nevertheless be encoded or decoded in parallel.

According to an embodiment, the encoder indicates that sequential decoding of tiles is required, e.g. in a picture parameter set and/or in a sequence parameter set. According to an embodiment, the decoder decodes that sequential decoding of tiles is required, e.g. from a picture parameter set and/or from a sequence parameter set.

According to an embodiment, each tile is associated with a tile cluster among two or more tile clusters. Tiles within a tile cluster can be decoded in parallel. Decoding order of tile clusters is determined.

According to an embodiment, tiles are associated with tile clusters in a pre-defined manner. For example, the left-most tile in each tile row may be clustered to a first tile cluster and all other tiles to a second tile cluster. The first tile cluster is required to be decoded before the second tile cluster.

According to an embodiment, the encoder encodes an indication, such as a flag or an index, per each tile, wherein the indication is indicative of the tile cluster of the tile. In an embodiment, the decoder decodes an indication, such as a flag or an index, per each tile, wherein the indication is indicative of the tile cluster of the tile. The indication may reside for example in a slice header, a tile header, a picture parameter set, and/or a sequence parameter set.

Figure 14:
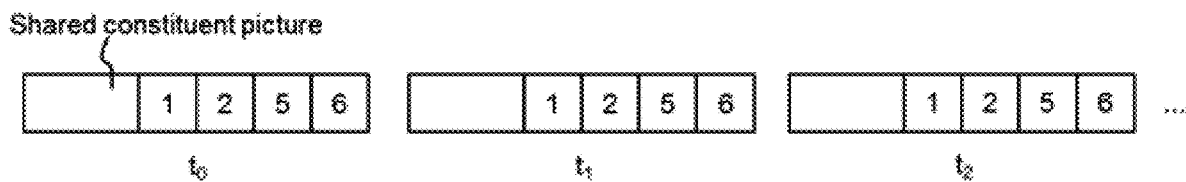
FIG. 14 shows an example of different sampling densities between the shared constituent picture and the tiles according to an embodiment of the invention.

According to an embodiment, the shared constituent picture may have a different sampling density than the tiles. Thus, resampling may be necessary as part of obtaining the prediction block. One example is illustrated in FIG. 14, where the tiles are parts of a first 360-degree equirectangular picture and the shared constituent picture is a second 360-degree equirectangular picture that has half the resolution horizontally and vertically compared to first 360-degree equirectangular picture.

According to an embodiment, an encoder encodes information indicative of the sampling ratio between the shared constituent picture and the tile(s) into the bitstream. Likewise, according to embodiment, a decoder decodes information indicative of the sampling ratio between the shared constituent picture and the tile(s) from the bitstream.

According to an embodiment, the position of the prediction unit (rel_x, rel_y) is scaled according to the sampling ratio for the derivation of the anchor position.

According to an embodiment, the encoder or decoded motion vector is subsequently scaled according to the sampling ratio for obtaining the prediction block. However, the motion vector without such scaling is stored in the motion field used for referencing. This may help in obtaining a coherent motion field and hence increase the likelihood of suitable prediction candidates being available.

According to an embodiment, a source block for obtaining the prediction block is identified by applying the motion vector relative to the anchor position. Herein, the motion vector and the anchor position may be scaled as described above. The proportional size of the source block relative to the size of the prediction block may be selected to be equal to the sampling ratio. The source block may be resampled according to the sampling ratio to obtain the prediction block.

According to an embodiment, a prediction unit is partitioned to motion units, which may for example comprise 4×4 samples. A motion vector for each motion unit may be derived from the motion vector of the prediction unit according to the sampling ratio. For example, if the sampling ratio indicates that the sampling interval of the shared constituent picture is half of that in the tiles both horizontally and vertically, and the motion vector is (4, 4) in sample units, the motion vectors for motion units may be derived to be equal to (2, 2). An anchor position and a prediction block are separately formed for each motion unit. The anchor position may be derived to be equal to (tile_x+rel_x*0.5, tile_y+rel_y*0.5), where 0.5 is the sampling ratio and (rel_x, rel_y) is the position of the motion unit within the tile.

According to an embodiment, an encoder indicates or concludes a transformation to be applied for the source block to obtain a prediction block, and subsequently applies the transformation. Likewise, according to embodiment, a decoder decodes or concludes a transformation to be applied for the source block to obtain a prediction block, and subsequently applies the transformation. The transformation may for example be a rotation of 90, 180, or 270 degrees, and/or horizontal mirroring, and/or vertical mirroring. For example, in pictures to be encoded and/or in decoded pictures, the shared constituent picture may have been rotated by 90 degrees compared to the tiles.

The term region-wise motion parameters may be defined as a collection of the horizontal vertical offset for the anchor position (tile_ref_x, tile_ref_y), the sampling ratio between the shared constituent picture and the tile, if applied, and the transformation, if any, to be applied for the source block originating from the shared constituent picture to obtain a prediction block for encoding/decoding a prediction unit in the tile.

According to an embodiment, a prediction unit is partitioned to motion units, wherein the motion vector applied for the first motion unit refers only to samples within the tile and a second motion unit is predicted relative to an anchor position that is relative to the horizontal and vertical offset. An anchor position and a prediction block are separately formed for each motion unit. An anchor position for the first motion unit is derived conventionally, i.e. the motion vector anchor position remains to be the position of the first motion unit. An anchor position for a second motion unit is set equal to (tile_x+rel_x, tile_y+rel_y), where (rel_x, rel_y) is the position of the motion unit relative to the current tile.

According to an embodiment, the encoder and/or the decoder infers that a zero motion vector is used when intra block copy is in use from any of the following:

The encoder may indicate in the bitstream or the decoder may decode from the bitstream that the motion vector anchor position offset mechanism is applied for all intra block copy motion vectors of the slice or the tile. Herein, the slice may contain the coded tile (as referred in other embodiments) or the slice may be contained in the coded tile (as referred in other embodiments). The indication may for example reside in the tile header, tile parameter set, slice header, slice parameter set, picture header, picture parameter set, sequence header, and/or sequence parameter set that applies to the slice or the tile.

The encoder indicates that the motion vector anchor position offset is used e.g. in a coding unit or prediction unit and that intra block copy is used for the same coding unit or the prediction unit, respectively, e.g. by indicating a reference index of the current picture. Likewise, the decoder decodes that the motion vector anchor position offset is used e.g. from a coding unit or prediction unit and that intra block copy is used for the same coding unit or the prediction unit, respectively, e.g. by decoding that a reference index of the current picture is in use for the coding unit or the prediction unit, respectively.

According to an embodiment, as a consequence of inferring that a zero motion vector is used when intra block copy is in use, the encoder omits indicating and/or the decoder omits decoding syntax elements indicative of the selected motion vector candidate or motion vector difference. Thus, this embodiment improves compression performance.

According to an embodiment, when a prediction candidate is an intra block copy motion vector and the current PU does not use the current picture as a reference picture, the encoder and/or the decoder excludes the prediction candidate from the prediction candidate list. Herein, the prediction mode and/or the type of candidate list are not limited to any particular mode or type and for example may be apply for both AMVP and the merge mode of HEVC, or alike. Despite the above-described exclusion of intra block copy motion vectors, the candidate list may otherwise be derived as explained earlier.

According to an embodiment, when a prediction candidate is an intra block copy motion vector and the current PU does not use the current picture as a reference picture, the encoder and/or the decoder considers the prediction candidate as unavailable for the derivation of the prediction candidate list. For example, if a spatial candidate position $B_0$ among the potential positions above the current PU contains an intra block copy motion vector and the current PU does not use the current picture as a reference picture, $B_0$ is considered unavailable and the next potential candidate position in a pre-defined order among the potential positions above the current PU is checked.

According to an embodiment, the above-mentioned exclusion or consideration as unavailable for the derivation of the prediction candidate list is applied only when the encoder and/or the decoder infers that a zero motion vector is used when intra block copy is in use as described above.

These embodiments exclude unlikely prediction candidates from the prediction candidate list and hence increase the likelihood that the prediction candidate list contains a suitable candidate to be selected by the encoder. Consequently, these embodiments are likely to improve compression performance.

According to an embodiment, region-wise motion parameters, such as tile_ref_x and tile_ref_y, may be indicated separately for different types of prediction or different types of prediction references. For example, one set of region-wise motion parameters may be indicated for intra block copy prediction and another set of region-wise motion parameters may be indicated for (temporal) inter prediction. In another example, one set of region-wise motion parameters may be indicated for temporal reference pictures and another set of region-wise motion parameters may be indicated for inter-view reference pictures.

According to an embodiment, region-wise motion parameters, such as tile_ref_x and tile_ref_y, may be indicated separately for each reference picture. The encoder may for example, estimate global motion between the current picture and a reference picture and compensate the global motion by setting the values of tile_ref_x and tile_ref_y accordingly. The encoder and decoder select which value pair of tile_ref_x, tile_ref_y is used depending on which reference picture is in use.

It needs to be understood that even though embodiments are described with reference to term tile, embodiments may be similarly applied to tile sets. In such a case a tile within a tile set may be used for conventional purposes, such as to achieve parallel processing. An encoder may indicate clustering of tiles into tile sets and/or partitioning of pictures into tile sets in the bitstream, and a decoder may decode clustering of tiles into tile sets and/or partitioning of pictures into tile sets from the bitstream.

In general, embodiments may be applied to any units or regions for partitioning pictures, such as one or more tiles, slices, or slice segments, and any combinations of them. That is, when embodiments refer to the term tile or enhanced quality tile, the embodiments can similarly be applied to another spatial unit. Similarly, when embodiments refer to the term shared constituent picture or constituent picture, they can similarly be applied to another spatial unit. An encoder may indicate in the bitstream which spatial unit is the scope of the indicated and/or inferred region-wise motion parameters, and/or a decoder may decode from the bitstream which spatial unit is the scope of the indicated and/or inferred region-wise motion parameters.

In an embodiment, the scope of the region-wise motion parameters is inferred from the syntax structure that contains region-wise motion parameters. For example, if the slice header or the slice parameter set contains region-wise motion parameters, it may be concluded that the scope of the region-wise motion parameters is the respective slice.

In an embodiment, the scope of the region-wise motion parameters is explicitly indicated in the bitstream and/or decoded from the bitstream. For example, an encoder may indicate a rectangle along with region-wise motion parameters that defines the scope of the region-wise motion parameters. The rectangle may be indicated for example through its top-left corner, width and height, or through its top-left and bottom-right corners. The coordinates and extents of the rectangle may be indicated using a certain partitioning grid, such as the tile grid or the CTU grid. It may be required that rectangle consists of an integer number of spatial units, such as an integer number of tiles and slices.

Figure 15:
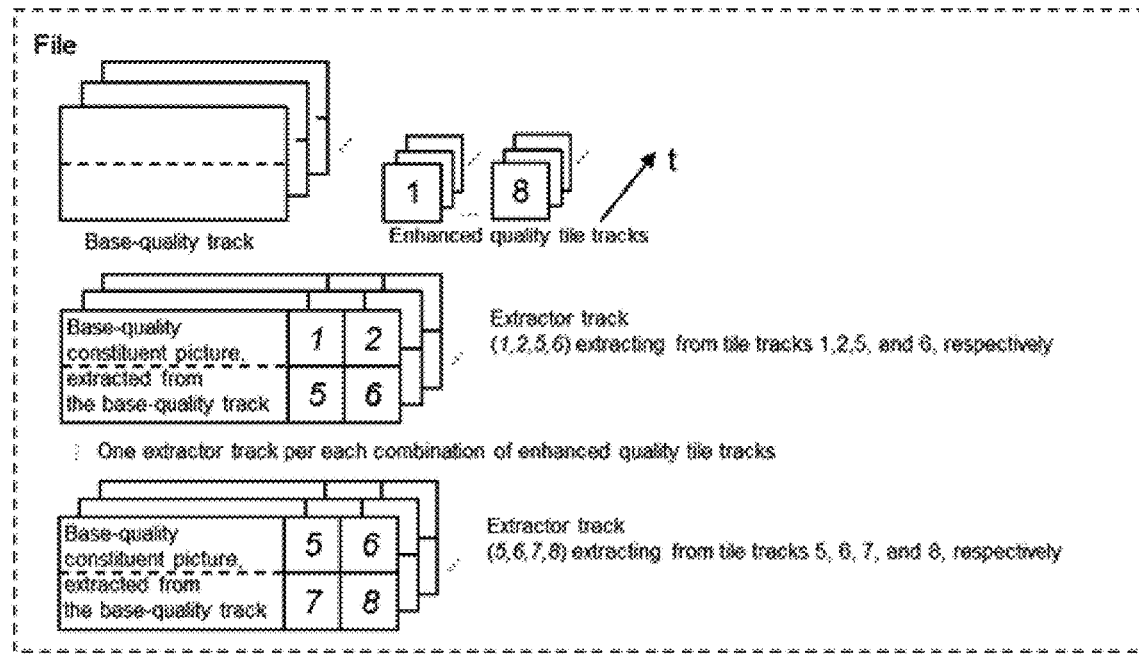
FIG. 15 shows an example of a container file arrangement according to an embodiment of the invention.

FIG. 15 illustrates an example of a container file arrangement. The encoded bitstream may be stored as one base-quality sub-picture track comprising the shared constituent pictures and one sub-picture or tile track per each enhanced quality tile. One extractor track can be created for a combination of enhanced quality tiles, which cover a certain range of viewing orientations. The extractor track includes track references to the base-quality sub-picture track and to the selected enhanced quality tile or sub-picture tracks. Samples of the extractor track include extractors that include constructors extracting data from the referred tracks. In another example, the extractor track may include the coded video data of the shared constituent pictures and contain extractors that include constructors extracting data from the sub-picture or tile tracks containing enhanced quality tiles.

Metadata may be included in the file, e.g. in the track level, to indicate characteristics of the extractor tracks. For example, region-wise packing metadata may be used to describe the relation of the regions in the (de)coded pictures relative to the projected picture of a certain projection format, such as equirectangular projection.

Another set of extractor tracks may be generated for another target maximum viewport field-of-view, e.g. extracting six enhanced quality tiles (i.e. tiles 1, 2, 5, 6, 7, 8) in this example.

Figure 16:
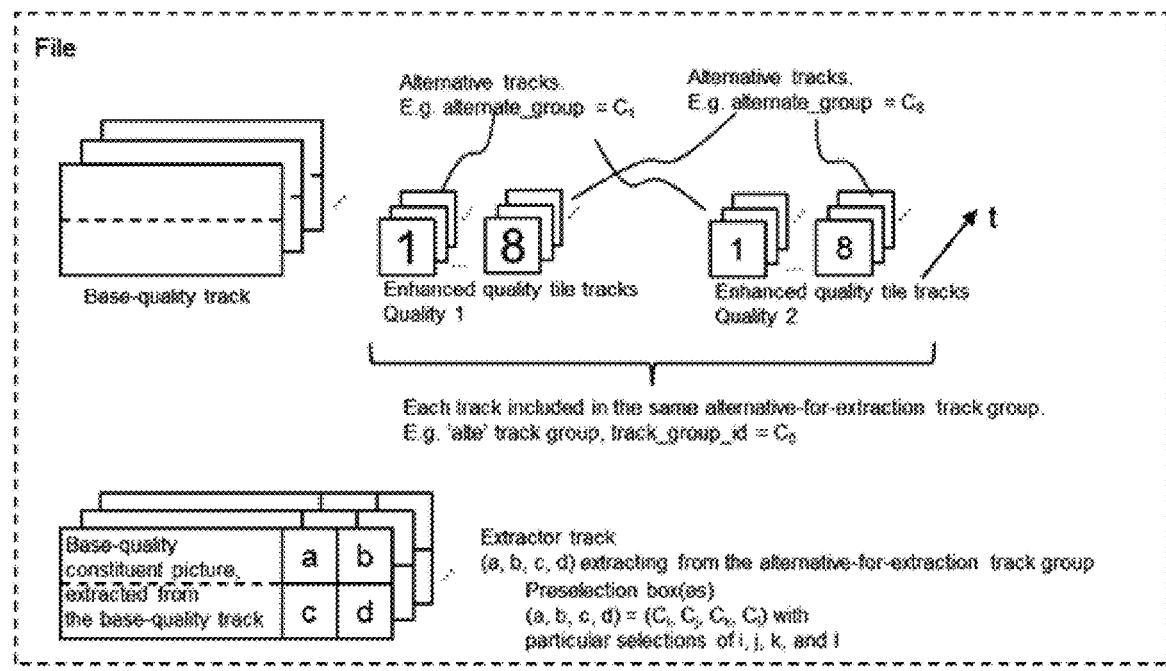
FIG. 16 shows an example of a container file authoring according to an embodiment of the invention.

According to an embodiment, container file authoring is applied for multiple bitrate versions, as shown in the example of FIG. 16. The encoded bitstreams are stored as tile or sub-picture tracks in the file. A group of tile or sub-picture tracks that are alternatives for extraction is indicated. In one alternative-for-extraction group, the tiles or sub-picture tracks need not represent the same packed region but are of the same size in terms of width and height in pixels. The track group identifier is required to differ from all track identifiers. In the example case, one alternative-for-extraction group is generated into the file, and all enhanced quality tile tracks are indicated to be members of this alternative-for-extraction group.

An extractor track is created into the file. Extractors are set to refer to the base-quality track and to the alternative-for-extraction track group. A sample in this example comprises six extractors, from which two extractors are used for extracting data from the base-quality track and four extractors refer to data from the enhanced quality tile or sub-picture tracks and are labeled a, b, c, d.

In an embodiment, rather than storing the region-wise packing information in the extractor track, the region-wise packing information is split into two pieces, where a first piece excludes the packed region location and is stored in the tile or sub-picture tracks, and a second piece incudes the packed region location and is stored in the extractor track.

In an embodiment, rather than storing the region-wise packing information in the extractor track, the region-wise packing information is stored in the tile or sub-picture tracks, and the location and size of the tile or sub-picture tracks in the resolved extractor track is indicated by another box, such as a particular track group. For example, sub-picture composition track group may be used. When a track includes a TrackGroupTypeBox with the sub-picture composition track type (i.e., a SubPictureCompositionBox), the track belongs to a composition of tracks that can be spatially arranged to obtain composition pictures. The visual tracks mapped to this grouping collectively represent visual content that can be presented. Each individual visual track mapped to this grouping may or may not be intended to be presented alone without other visual tracks, while composition pictures are suitable to be presented. A composition picture can be derived by spatially arranging the decoding outputs of the composition-aligned samples of all tracks belonging to the same sub-picture composition track group. The SubPictureCompositionBox contains the spatial position, the width and the height of the track within the composition picture.

In an embodiment, the following information is included in SubPictureCompositionBox e.g. by a file writer: a maximum index (max_index) and a track index (track_index). max_index equal to 0 may be allowed and may specify that a composition picture may be derived from any number of sub-picture tracks. max_index greater than 0 specifies that a composition picture is derived from the sub-picture tracks with each value of track_index in the range of 0 to max_index, inclusive. The value of max_index is the same for all tracks belonging to the same sub-picture composition track group. track_index specifies an index of the sub-picture track in the sub-picture composition track group. All tracks belonging to the same alternate group (i.e., having the same non-zero alternate_group value) have the same track_index value. The value of track_index of track A is not be equal to the value of track_index of track B, unless track A and track B belong to the same alternate group. In an embodiment, a file parser or alike detects if there are gaps in track_index values in the range of 0 to max_index, inclusive. If so, some sub-picture tracks have not been received and it may be concluded that composition pictures cannot be correctly reconstructed.

According to an embodiment, omnidirectional video pre-selections are indicated in a container file and/or in an MPD e.g. using the DASH preselection feature, each defining a combination of tile or sub-picture tracks. Each preselection indicates from which individual sub-picture or tile track(s) data is extracted from. Characteristics of a preselection may be indicated, e.g. comprising the sphere region of enhanced quality.

Figure 17:
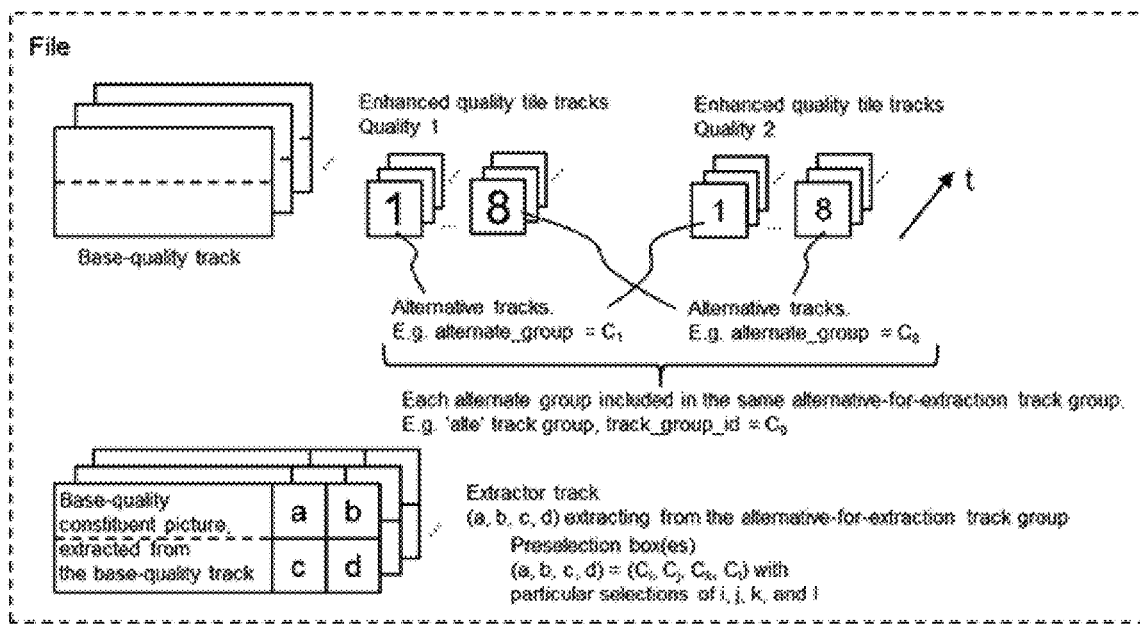
FIG. 17 shows another example of a container file authoring according to an embodiment of the invention.

In an alternative arrangement shown in FIG. 17, the alternative-for-extraction track groups are formed from alternate groups rather than from tracks. In other words, complete alternate group(s) are indicated to be member(s) of an alternative-for-extraction group.

With the container file authoring embodiments above, the receiver can select any combination of tile or sub-picture tracks to be received and decoded with a certain extractor track. Consequently, the number of encoded bitstreams and stored enhanced quality tile tracks is considerably reduced when compared to those needed in SP-CILP.

In the following, some embodiments relating to stereoscopic content are discussed more in detail.

According to an embodiment, intra block copy motion vectors for a prediction unit in a tile of a predicted view are allowed to refer to the respective tile of an independent view. The motion vector anchor position for such motion vectors is derived conventionally, i.e. remains to be the position of the current prediction unit.

According to an embodiment, an encoder indicates in the bitstream that encoded pictures comprise content from more than one view and indicates the packing arrangement of content from views in decoded pictures. When a motion vector of a prediction unit of a second view refers only to samples of a first view, the encoder derives the motion vector anchor position conventionally, i.e. the motion vector anchor position remains to be the position of the current prediction unit. Otherwise, previously described embodiments apply.

According to an embodiment, a decoder decodes from the bitstream that encoded pictures comprise content from more than one view and indicates the packing arrangement of content from views in decoded pictures. When a motion vector of a prediction unit of a second view refers only to samples of a first view, the decoder derives the motion vector anchor position conventionally, i.e. the motion vector anchor position remains to be the position of the current prediction unit. Otherwise, previously described embodiments apply.

According to an embodiment, an encoder indicates in the bitstream or the decoder decodes from the bitstream an allowed source region or an allowed source tile or alike for a tile of a predicted view. When the motion vector refers only to samples of the allowed source region or the allowed source tile or alike, the encoder or the decoder derives the motion vector anchor position conventionally, i.e. the motion vector anchor position remains to be the position of the current prediction unit. Otherwise, previously described embodiments apply.

Figures 18, 19:
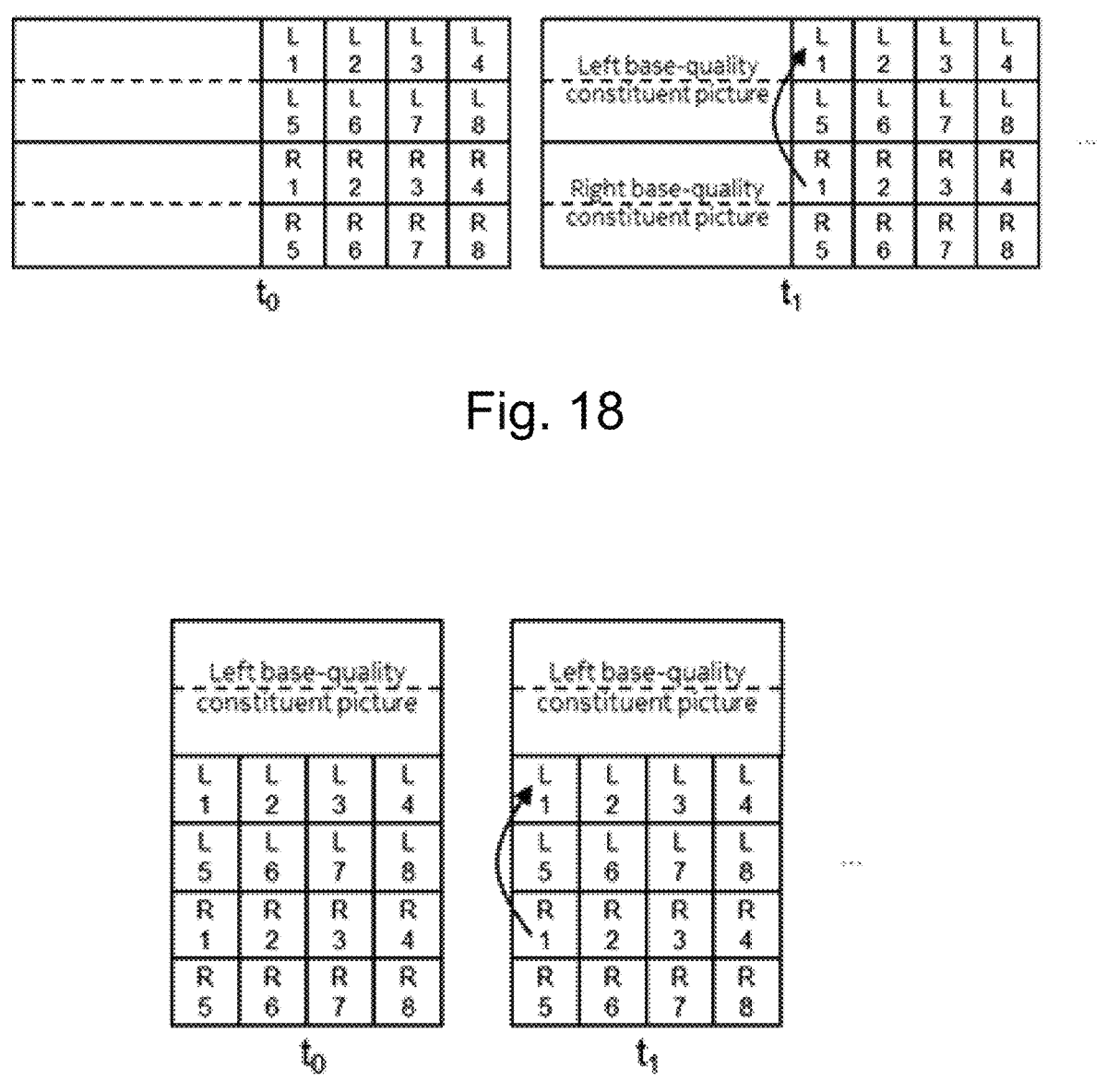

An example of an arrangement for stereoscopic coding is illustrated in FIG. 18. The arrow illustrates a motion vector for a prediction unit in tile R1 of the right view. The motion vector refers only to tile L1 of the left view that corresponds to the tile R1. It may be assumed that when stereoscopic content is decoded, both tiles L1 and R1 are obtained and hence prediction dependency between them is acceptable. This prediction may be regarded to be similar to inter-view prediction. The encoder sets a horizontal offset and a vertical offset for the anchor position (tile_ref_x, tile_ref_y) to indicate the top-left corner of the tile within the respective shared constituent picture. For example, (tile_ref_x, tile_ref_y) for tile R1 indicates the respective position of tile R1 within the right base-quality constituent picture.

FIG. 19 illustrates another example of an arrangement for stereoscopic coding. Here it is assumed that the transmitted enhanced-quality tiles would cover the viewport and hence the base-quality predicted view (right view in this example) might not be helpful for displaying and also disadvantageous for rate-distortion performance. The example is similar to the previous example except when setting a horizontal offset and a vertical offset for the anchor position (tile_ref_x, tile_ref_y) for the predicted-view tiles, the encoder may for example use a global or average disparity between the views to indicate the relative position of the tile within the shared constituent picture.

Figure 20:
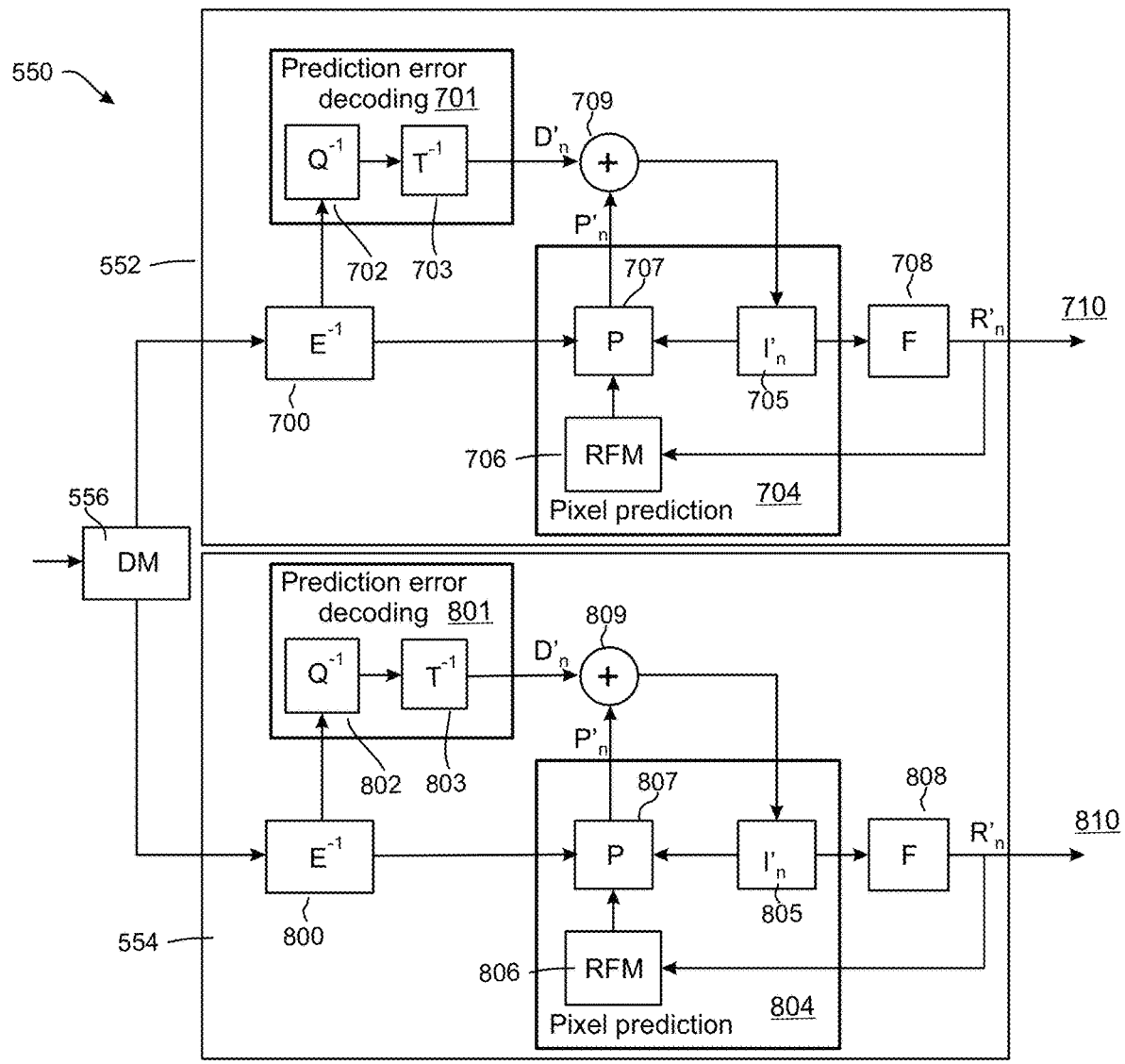
FIG. 20 shows a schematic diagram of a decoder suitable for implementing embodiments of the invention.

FIG. 20 shows a block diagram of a video decoder suitable for employing embodiments of the invention. FIG. 20 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform (T). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Figure 21:
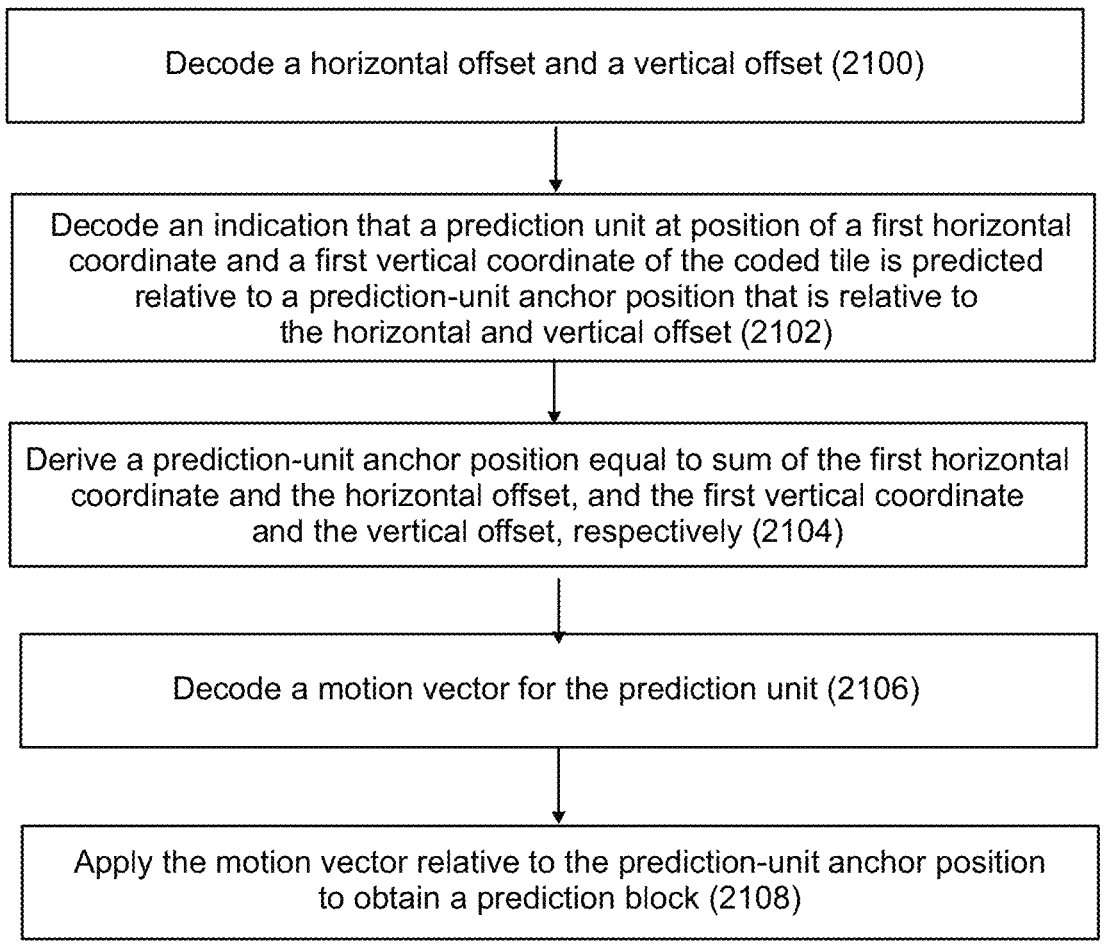
FIG. 21 shows a flow chart of a decoding method according to an embodiment of the invention.

The decoder may be arranged to carry out a decoding method according to an aspect of the invention. The decoding method, as shown in FIG. 21, comprises decoding a coded tile into a decoded tile, the decoding comprising: decoding (2100) a horizontal offset and a vertical offset; decoding (2102) an indication that a prediction unit at position of a first horizontal coordinate and a first vertical coordinate of the coded tile is predicted relative to a prediction-unit anchor position that is relative to the horizontal and vertical offset; deriving (2104) a prediction-unit anchor position equal to sum of the first horizontal coordinate and the horizontal offset, and the first vertical coordinate and the vertical offset, respectively; determining (2106) a motion vector for the prediction unit; and applying (2108) the motion vector relative to the prediction-unit anchor position to obtain a prediction block.

The horizontal offset and/or the vertical offset may be indicative of a location outside the decoded tile. Determining (2106) a motion vector for the prediction unit may for example be done by decoding the motion vector from the coded tile.

In an embodiment, the decoding method further comprises decoding a coded constituent picture into a decoded constituent picture, and wherein the motion vector is indicative of a location within the decoded constituent picture.

In an embodiment, the decoded tile represents a subset of content represented by the decoded constituent picture. The decoded tile may for example have higher fidelity compared to that of the decoded constituent picture. The horizontal offset and/or the vertical offset may be indicative of the location correspondence of the decoded tile relative to the decoded constituent picture.

In an embodiment, the decoding method further comprises decoding region-wise packing metadata from or along the coded tile and/or the coded constituent picture, such as from a file containing the coded tile and/or the coded constituent picture, and concluding from the region-wise packing metadata location correspondence of the decoded tile relative to the decoded constituent picture. The location correspondence may for example be concluded on a projected picture of a particular omnidirectional projection format or on a sphere onto which the decoded constituent picture and the decoded tile may be projected.

In an embodiment, the decoding method further comprises concluding that the decoded tile is used in displaying whenever the decoded tile and the decoded constituent picture are overlapping based on their location correspondence. The decoding method may for example decode region-wise quality ranking information providing quality ranking values for regions on decoded pictures, the regions included the decoded tile and the decoded constituent picture. The region-wise quality ranking information may be available in or along the coded tile and/or the coded constituent picture, such as in a file containing the coded tile and/or the coded constituent picture. Based on the decoded region-wise quality ranking information, the decoding method may conclude that the decoded tile has higher quality than the decoded constituent picture and thus the decoded tile is used in displaying whenever the decoded tile and the decoded constituent picture are overlapping based on their location correspondence.

In an embodiment, the decoded tile represents a different view of multiview video/image than the decoded constituent picture. The decoding method may decode information from or along the coded tile and/or the coded constituent on which views they represent, such as a view index or an indication of left vs. right view for stereoscopic content. For example, a frame packing arrangement SEI method of H.264/AVC or HEVC may be decoded, and/or the view information may be decoded from region-wise packing metadata.

Herein, the decoder should be interpreted to cover any operational unit capable to carry out the decoding operations, such as a player, a receiver, a gateway, a demultiplexer and/or a decoder.

The decoding operations may be carried out by with a single-layer codec, such as HEVC Main profile codec, i.e. no scalable coding extension is required. The use of shared codec pictures as described above enable similar functionality as provided in the SHVC ROI approach by the infrequent IRAP pictures in the base layer and the relatively frequent IRAP pictures in enhancement layers. This functionality can be used for achieving frequent switching capability with moderate rate-distortion penalty.

Figure 22:
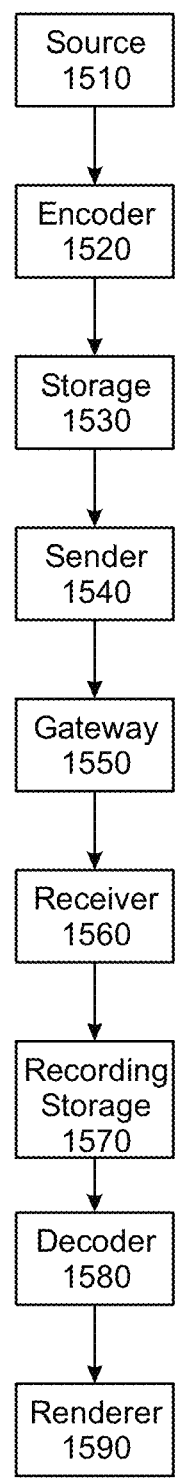
FIG. 22 shows a schematic diagram of an example multimedia communication system within which various embodiments may be implemented.

FIG. 22 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder.

In the above, some embodiments have been described with reference to segments, e.g. as defined in MPEG-DASH. It needs to be understood that embodiments may be similarly realized with subsegments, e.g. as defined in MPEG-DASH.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client. For example, some embodiments could be realized with the M3U manifest format.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder. For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
  encoding an input picture into a coded constituent picture;
  reconstructing, as a part of said encoding, a decoded constituent picture corresponding to the coded constituent picture;
  encoding a spatial region of the input picture into a coded tile, the encoding comprising:
    determining a horizontal offset and a vertical offset indicative of a region-wise anchor position of the spatial region within the decoded constituent picture;
    encoding the horizontal offset and the vertical offset;
    determining that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region;
    indicating that the prediction unit is predicted relative to a prediction-unit anchor position that is relative to the horizontal offset and the vertical offset;
    deriving the prediction-unit anchor position equal to sum of the first horizontal coordinate and the horizontal offset, and the first vertical coordinate and the vertical offset, respectively;

determining a motion vector for the prediction unit; and applying the motion vector relative to the prediction-unit anchor position to obtain a prediction block; and encoding, in response to said coded constituent picture and said coded tile comprising different sampling densities, information indicative of a sampling ratio between the coded constituent picture and the coded tile into a bitstream.

2. The method according to claim 1, further comprising:
scaling the first horizontal coordinate and the first vertical coordinate of the prediction unit according to the sampling ratio for the derivation of the prediction-unit anchor position.

3. The method according to claim 2, further comprising:
scaling the motion vector according to the sampling ratio for obtaining the prediction block.

4. The method according to claim 3, further comprising:
identifying a source block for obtaining the prediction block, comprising applying the motion vector relative to the prediction-unit anchor position.

5. The method according to claim 1, further comprising:
partitioning the prediction unit to motion units; and
deriving a respective motion vector for respective ones of the motion units from the motion vector of the prediction unit according to the sampling ratio.

6. The method according to claim 1, further comprising:
indicating for said coded tile that a motion vector anchor position offset mechanism is applied for motion vectors of the coded tile.

7. An apparatus comprising:
at least one processor and
at least one non-transitory memory, said at least one memory stored with code thereon, which when executed by said at least one processor, causes the apparatus to perform:
encode an input picture into a coded constituent picture;
reconstruct, as a part of said encoding, a decoded constituent picture corresponding to the coded constituent picture;
encode a spatial region of the input picture into a coded tile, comprising causing the apparatus to:
determine a horizontal offset and a vertical offset indicative of a region-wise anchor position of the spatial region within the decoded constituent picture;
encode the horizontal offset and the vertical offset;
determine that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region;
indicate that the prediction unit is predicted relative to a prediction-unit anchor position that is relative to the horizontal offset and the vertical offset;
derive the prediction-unit anchor position equal to sum of the first horizontal coordinate and the horizontal offset, and the first vertical coordinate and the vertical offset, respectively;
determine a motion vector for the prediction unit; and
apply the motion vector relative to the prediction-unit anchor position to obtain a prediction block; and
encode, in response to said coded constituent picture and said coded tile comprising different sampling densities, information indicative of a sampling ratio between the coded constituent picture and the coded tile into a bitstream.

8. The apparatus according to claim 7, further comprising code which when executed by said at least one processor, causes the apparatus to:
scale the first horizontal coordinate and the first vertical coordinate of the prediction unit according to the sampling ratio for the derivation of the prediction-unit anchor position.

9. The apparatus according to claim 8, further comprising code which when executed by said at least one processor, causes the apparatus to:
scale the motion vector according to the sampling ratio for obtaining the prediction block.

10. The apparatus according to claim 9, further comprising code which when executed by said at least one processor, causes the apparatus to:
identify a source block for obtaining the prediction block, comprising applying the motion vector relative to the prediction-unit anchor position.

11. The apparatus according to claim 7, further comprising code which when executed by said at least one processor, causes the apparatus to:
partition the prediction unit to motion units; and
derive a respective motion vector for respective ones of the motion units from the motion vector of the prediction unit according to the sampling ratio.

12. The apparatus according to claim 7, further comprising code which when executed by said at least one processor, causes the apparatus to:
indicate for said coded tile that a motion vector anchor position offset mechanism is applied for motion vectors of the coded tile.

13. A method comprising:
decoding, from a bitstream, a coded constituent picture;
decoding a coded tile into a decoded tile, the decoding comprising:
decoding a horizontal offset and a vertical offset;
decoding an indication that a prediction unit at position of a first horizontal coordinate and a first vertical coordinate of the coded tile is predicted relative to a prediction-unit anchor position that is relative to the horizontal offset and the vertical offset;
deriving the prediction-unit anchor position equal to sum of the first horizontal coordinate and the horizontal offset, and the first vertical coordinate and the vertical offset, respectively;
determining a motion vector for the prediction unit; and
applying the motion vector relative to the prediction-unit anchor position to obtain a prediction block;
decoding, from the bitstream, information indicative of a sampling ratio between the coded constituent picture and the coded tile; and
scaling the first horizontal coordinate and the first vertical coordinate of the prediction unit according to the sampling ratio for the derivation of the prediction-unit anchor position.

14. The method according to claim 13, further comprising:
scaling the motion vector according to the sampling ratio for obtaining the prediction block.

15. The method according to claim 13, further comprising:
  partitioning the prediction unit to motion units; and
  deriving a respective motion vector for respective ones of the motion units from the motion vector of the prediction unit according to the sampling ratio.

16. The method according to claim 13, further comprising:
  decoding an indication for said coded tile that a motion vector anchor position offset mechanism is applied for motion vectors of the coded tile.

17. An apparatus comprising:
  at least one processor and
  at least one non-transitory memory, said at least one memory stored with code thereon, which when executed by said at least one processor, causes the apparatus to perform:
    decode, from a bitstream, a coded constituent picture;
    decode a coded tile into a decoded tile, comprising causing the apparatus to:
      decode a horizontal offset and a vertical offset;
      decode an indication that a prediction unit at position of a first horizontal coordinate and a first vertical coordinate of the coded tile is predicted relative to a prediction-unit anchor position that is relative to the horizontal offset and the vertical offset;
      derive the prediction-unit anchor position equal to sum of the first horizontal coordinate and the horizontal offset, and the first vertical coordinate and the vertical offset, respectively;
      determine a motion vector for the prediction unit; and
      apply the motion vector relative to the prediction-unit anchor position to obtain a prediction block;
    decode, from the bitstream, information indicative of a sampling ratio between the coded constituent picture and the coded tile; and
    scale the first horizontal coordinate and the first vertical coordinate of the prediction unit according to the sampling ratio for the derivation of the prediction-unit anchor position.

18. The apparatus according to claim 17, further comprising code which when executed by said at least one processor, causes the apparatus to:
  scale the motion vector according to the sampling ratio for obtaining the prediction block.

19. The apparatus according to claim 17, further comprising code which when executed by said at least one processor, causes the apparatus to:
  partition the prediction unit to motion units; and
  derive a respective motion vector for respective ones of the motion units from the motion vector of the prediction unit according to the sampling ratio.

20. The apparatus according to claim 17, further comprising code which when executed by said at least one processor, causes the apparatus to:
  decode an indication for said coded tile that a motion vector anchor position offset mechanism is applied for motion vectors of the coded tile.

* * * * *